United States Patent
Hockey et al.

(10) Patent No.: US 11,922,492 B2
(45) Date of Patent: *Mar. 5, 2024

(54) SYSTEM AND METHOD FOR PROGRAMMATICALLY ACCESSING FINANCIAL DATA

(71) Applicant: Plaid Inc., San Francisco, CA (US)

(72) Inventors: William Hockey, San Francisco, CA (US); Charles Li, San Francisco, CA (US); Zach Perret, San Francisco, CA (US)

(73) Assignee: Plaid Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,233

(22) Filed: Sep. 5, 2023

(65) Prior Publication Data
US 2023/0419398 A1    Dec. 28, 2023

Related U.S. Application Data

(63) Continuation of application No. 17/302,630, filed on May 7, 2021, now Pat. No. 11,798,072, which is a
(Continued)

(51) Int. Cl.
*G06Q 40/02* (2023.01)
*G06F 21/31* (2013.01)
(Continued)

(52) U.S. Cl.
CPC ............ *G06Q 40/02* (2013.01); *G06F 21/31* (2013.01); *G06Q 40/00* (2013.01); *G06Q 40/12* (2013.12)

(58) Field of Classification Search
CPC ........ G06Q 40/02; G06Q 40/12; G06Q 40/00; G06F 21/31
See application file for complete search history.

(56) References Cited

U.S. PATENT DOCUMENTS

| 5,063,507 A | 11/1991 | Lindsey et al. |
| 5,237,499 A | 8/1993 | Garback |

(Continued)

FOREIGN PATENT DOCUMENTS

| EP | 848336 A1 | 6/1998 |
| EP | 848338 A1 | 6/1998 |

(Continued)

OTHER PUBLICATIONS

Wu, Xindong, et al. "Data mining with big data." IEEE transactions on knowledge and data engineering 26.1 (2013): 97-107. (Year: 2013).*

(Continued)

*Primary Examiner* — Asfand M Sheikh
(74) *Attorney, Agent, or Firm* — Banner & Witcoff, Ltd.

(57) ABSTRACT

Systems and methods for programmatic access of external financial service systems. An application proxy instance is created that simulates an application of an external financial service system. A normalized account request is received for financial data of the external financial service system for a specified account. The normalized account request is provided by an external financial application system by using a financial data API of the financial platform system. Responsive to the normalized account request, communication is negotiated with the external financial service system by using the application proxy instance to access the requested financial data from the external financial service system by using a proprietary Application Programming Interface (API) of the external financial service system. The financial data is provided to the external financial application system as a response to the normalized account request.

21 Claims, 9 Drawing Sheets

Related U.S. Application Data continuation of application No. 16/396,505, filed on Apr. 26, 2019, now Pat. No. 11,030,682, which is a continuation of application No. 15/258,299, filed on Sep. 7, 2016, now Pat. No. 10,319,029, which is a continuation of application No. 14/790,840, filed on Jul. 2, 2015, now Pat. No. 9,449,346, which is a continuation of application No. 14/719,110, filed on May 21, 2015, now abandoned.

(60) Provisional application No. 62/001,452, filed on May 21, 2014.

(51) Int. Cl.
  *G06Q 40/00* (2023.01)
  *G06Q 40/12* (2023.01)

(56) References Cited

U.S. PATENT DOCUMENTS

| | | |
|---|---|---|
| 5,347,632 A | 9/1994 | Filepp et al. |
| 5,634,127 A | 5/1997 | Cloud et al. |
| 5,649,186 A | 7/1997 | Ferguson |
| 5,701,451 A | 12/1997 | Rogers et al. |
| 5,710,884 A | 1/1998 | Dedrick |
| 5,710,918 A | 1/1998 | Lagarde et al. |
| 5,721,908 A | 2/1998 | Lagarde et al. |
| 5,727,159 A | 3/1998 | Kikinis |
| 5,745,754 A | 4/1998 | Lagarde et al. |
| 5,752,246 A | 5/1998 | Rogers et al. |
| 5,778,065 A | 7/1998 | Hauser et al. |
| 5,778,367 A | 7/1998 | Wesinger, Jr. et al. |
| 5,787,403 A | 7/1998 | Randle |
| 5,793,964 A | 8/1998 | Rogers et al. |
| 5,813,007 A | 9/1998 | Nielsen |
| 5,815,665 A | 9/1998 | Teper et al. |
| 5,819,284 A | 10/1998 | Farber et al. |
| 5,835,724 A | 11/1998 | Smith |
| 5,838,910 A | 11/1998 | Domenikos et al. |
| 5,838,916 A | 11/1998 | Domenikos et al. |
| 5,845,073 A | 12/1998 | Carlin et al. |
| 5,855,018 A | 12/1998 | Chor et al. |
| 5,862,325 A | 1/1999 | Reed et al. |
| 5,870,559 A | 2/1999 | Leshem et al. |
| 5,875,296 A | 2/1999 | Shi et al. |
| 5,878,219 A | 3/1999 | Vance, Jr. et al. |
| 5,892,905 A | 4/1999 | Brandt et al. |
| 5,892,909 A | 4/1999 | Grasso et al. |
| 5,898,836 A | 4/1999 | Freivald et al. |
| 5,901,287 A | 5/1999 | Bull et al. |
| 5,903,881 A | 5/1999 | Schrader et al. |
| 5,908,469 A | 6/1999 | Botz et al. |
| 5,913,214 A | 6/1999 | Madnick et al. |
| 5,918,216 A | 6/1999 | Miksovsky et al. |
| 5,920,848 A | 7/1999 | Schutzer et al. |
| 5,926,798 A | 7/1999 | Carter |
| 5,930,764 A | 7/1999 | Melchione et al. |
| 5,930,777 A | 7/1999 | Barber |
| 5,933,604 A | 8/1999 | Inakoshi |
| 5,933,816 A | 8/1999 | Zeanah et al. |
| 5,956,720 A | 9/1999 | Fernandez et al. |
| 5,961,593 A | 10/1999 | Gabber et al. |
| 5,961,601 A | 10/1999 | Iyengar |
| 5,963,915 A | 10/1999 | Kirsch |
| 5,963,925 A | 10/1999 | Kolling et al. |
| 5,966,967 A | 10/1999 | Agrawal et al. |
| 5,978,828 A | 11/1999 | Greer et al. |
| 5,978,842 A | 11/1999 | Noble et al. |
| 5,983,267 A | 11/1999 | Shklar et al. |
| 5,983,268 A | 11/1999 | Freivald et al. |
| 5,987,440 A | 11/1999 | O'Neil et al. |
| 5,987,454 A | 11/1999 | Hobbs |
| 5,995,943 A | 11/1999 | Bull et al. |
| 5,999,971 A | 12/1999 | Buckland |
| 6,003,032 A | 12/1999 | Bunney et al. |
| 6,006,333 A | 12/1999 | Nielsen |
| 6,023,698 A | 2/2000 | Lavey, Jr. et al. |
| 6,041,362 A | 3/2000 | Mears et al. |
| 6,047,327 A | 4/2000 | Tso et al. |
| 6,055,570 A | 4/2000 | Nielsen |
| 6,078,929 A | 6/2000 | Rao |
| 6,082,776 A | 7/2000 | Feinberg |
| 6,092,196 A | 7/2000 | Reiche |
| 6,092,197 A | 7/2000 | Coueignoux |
| 6,105,131 A | 8/2000 | Carroll |
| 6,119,101 A | 9/2000 | Peckover |
| 6,138,158 A | 10/2000 | Boyle et al. |
| 6,148,337 A | 11/2000 | Estberg et al. |
| 6,151,581 A | 11/2000 | Kraftson et al. |
| 6,151,601 A | 11/2000 | Papierniak et al. |
| 6,182,142 B1 | 1/2001 | Win et al. |
| 6,185,567 B1 | 2/2001 | Ratnaraj et al. |
| 6,195,698 B1 | 2/2001 | Lillibridge et al. |
| 6,199,077 B1 | 3/2001 | Inala et al. |
| 6,205,433 B1 | 3/2001 | Boesch et al. |
| 6,208,975 B1 | 3/2001 | Bull et al. |
| 6,209,007 B1 | 3/2001 | Kelley et al. |
| 6,242,968 B1 | 6/2001 | Sakai et al. |
| 6,243,816 B1 | 6/2001 | Fang et al. |
| 6,246,999 B1 | 6/2001 | Riley et al. |
| 6,278,449 B1 | 8/2001 | Sugiarto et al. |
| 6,278,999 B1 | 8/2001 | Knapp |
| 6,292,789 B1 | 9/2001 | Schutzer |
| 6,297,819 B1 | 10/2001 | Furst |
| 6,301,584 B1 | 10/2001 | Ranger |
| 6,308,203 B1 | 10/2001 | Itabashi et al. |
| 6,311,275 B1 | 10/2001 | Jin et al. |
| 6,317,783 B1 | 11/2001 | Freishtat et al. |
| 6,360,205 B1 | 3/2002 | Yengar et al. |
| 6,366,933 B1 | 4/2002 | Ball et al. |
| 6,401,118 B1 | 6/2002 | Thomas |
| 6,405,245 B1 | 6/2002 | Burson et al. |
| 6,412,073 B1 | 6/2002 | Rangan |
| 6,430,539 B1 | 8/2002 | Lazarus et al. |
| 6,484,155 B1 | 11/2002 | Kiss et al. |
| 6,499,042 B1 | 12/2002 | Markus |
| 6,510,451 B2 | 1/2003 | Wu et al. |
| 6,519,571 B1 | 2/2003 | Guheen et al. |
| 6,567,411 B2 | 5/2003 | Dahlen |
| 6,567,850 B1 | 5/2003 | Freishtat et al. |
| 6,594,766 B2 | 7/2003 | Rangan et al. |
| 6,631,402 B1 | 10/2003 | Devine et al. |
| 6,632,248 B1 | 10/2003 | Isaac et al. |
| 6,633,910 B1 | 10/2003 | Rajan et al. |
| 6,725,200 B1 | 4/2004 | Rost |
| 6,802,042 B2 | 10/2004 | Rangan et al. |
| 6,859,931 B1 | 2/2005 | Cheyer et al. |
| 6,957,199 B1 | 10/2005 | Fisher |
| 7,028,049 B1 | 4/2006 | Shelton |
| 7,072,932 B1 | 7/2006 | Stahl |
| 7,092,913 B2 | 8/2006 | Cannon, Jr. |
| 7,200,578 B2 | 4/2007 | Paltenghe et al. |
| 7,263,548 B2 | 8/2007 | Daswani et al. |
| 7,275,046 B1 | 9/2007 | Tritt et al. |
| 7,340,411 B2 | 3/2008 | Cook |
| 7,370,011 B2 | 5/2008 | Bennett et al. |
| 7,424,520 B2 | 9/2008 | Daswani et al. |
| 7,640,210 B2 | 12/2009 | Bennett et al. |
| 7,752,535 B2 | 7/2010 | Satyavolu |
| 8,006,291 B2 | 8/2011 | Headley et al. |
| 8,010,783 B1 | 8/2011 | Cahill |
| 8,086,508 B2 | 12/2011 | Dheer et al. |
| 8,140,431 B1 | 3/2012 | Murphy |
| 8,145,914 B2 | 3/2012 | Steeves |
| 8,166,562 B2 | 4/2012 | Holvey et al. |
| 8,209,194 B1 | 6/2012 | Nidy et al. |
| 8,266,515 B2 | 9/2012 | Satyavolu |
| 8,407,118 B1 | 3/2013 | Zazelenchuk et al. |
| 8,613,066 B1 | 12/2013 | Brezinski et al. |
| 8,645,264 B2 | 2/2014 | Allison et al. |
| 8,676,611 B2 | 3/2014 | McLaughlin et al. |
| 8,739,260 B1 | 5/2014 | Damm-Goossens |
| 8,788,416 B1 | 7/2014 | Vu |
| 8,995,967 B1 | 3/2015 | Billman |

(56) References Cited

U.S. PATENT DOCUMENTS

| | | |
|---|---|---|
| 9,106,642 B1 | 8/2015 | Bhimanaik |
| 9,202,250 B1 | 12/2015 | Palaniappan |
| 9,418,387 B1 | 8/2016 | Aaron et al. |
| 9,430,892 B2 | 8/2016 | Amdahl |
| 9,449,346 B1 | 9/2016 | Hockey et al. |
| 9,595,023 B1 | 3/2017 | Hockey et al. |
| 9,699,187 B2 | 7/2017 | Chen et al. |
| 9,774,590 B1 | 9/2017 | Bronshtein et al. |
| 9,906,520 B2 | 2/2018 | Fouad et al. |
| 9,946,996 B1 | 4/2018 | Bedell |
| 10,003,591 B2 | 6/2018 | Hockey et al. |
| 10,104,059 B2 | 10/2018 | Hockey et al. |
| 10,319,029 B1 | 6/2019 | Hockey et al. |
| 10,339,608 B1 | 7/2019 | Haitz et al. |
| 10,523,653 B2 | 12/2019 | Hockey et al. |
| 10,530,761 B2 | 1/2020 | Hockey et al. |
| 10,546,348 B1 | 1/2020 | Lesner et al. |
| 10,614,463 B1 | 4/2020 | Hockey et al. |
| 10,679,303 B1 | 6/2020 | Aaron et al. |
| 10,726,491 B1 | 7/2020 | Hockey et al. |
| 10,762,559 B2 | 9/2020 | Alejo et al. |
| 10,878,421 B2 | 12/2020 | Putnam |
| 10,904,239 B2 | 1/2021 | Hockey et al. |
| 10,984,468 B1 | 4/2021 | Hockey et al. |
| 11,030,682 B1 | 6/2021 | Hockey et al. |
| 11,050,729 B2 | 6/2021 | Hockey et al. |
| 11,216,814 B1 | 1/2022 | Hockey et al. |
| 11,295,294 B1 | 4/2022 | Kurani et al. |
| 11,316,862 B1 | 4/2022 | Pate et al. |
| 11,327,960 B1 | 5/2022 | Jin et al. |
| 11,430,057 B1 | 8/2022 | Hockey et al. |
| 11,468,085 B2 | 10/2022 | Putnam et al. |
| 11,503,010 B2 | 11/2022 | Hockey et al. |
| 11,580,544 B2 | 2/2023 | Putnam |
| 11,682,070 B2 | 6/2023 | Hockey et al. |
| 2001/0011274 A1 | 8/2001 | Klug et al. |
| 2002/0002596 A1 | 1/2002 | Sugiarto et al. |
| 2002/0065772 A1 | 5/2002 | Saliba et al. |
| 2002/0091635 A1 | 7/2002 | Dilip et al. |
| 2002/0095588 A1 | 7/2002 | Shigematsu et al. |
| 2003/0023879 A1 | 1/2003 | Wray |
| 2003/0028646 A1 | 2/2003 | Wray |
| 2003/0060896 A9 | 3/2003 | Hulai et al. |
| 2003/0158960 A1 | 8/2003 | Engberg |
| 2003/0163425 A1 | 8/2003 | Cannon, Jr. |
| 2003/0182035 A1 | 9/2003 | DiLodovico et al. |
| 2003/0185370 A1 | 10/2003 | Rosera et al. |
| 2003/0204460 A1 | 10/2003 | Robinson et al. |
| 2004/0059672 A1 | 3/2004 | Baig et al. |
| 2005/0027617 A1 | 2/2005 | Zucker et al. |
| 2005/0154913 A1 | 7/2005 | Barriga et al. |
| 2005/0177510 A1 | 8/2005 | Hilt et al. |
| 2005/0222929 A1 | 10/2005 | Steier et al. |
| 2005/0246269 A1 | 11/2005 | Smith |
| 2006/0015358 A1 | 1/2006 | Chua |
| 2006/0116949 A1 | 6/2006 | Wehunt et al. |
| 2006/0136332 A1 | 6/2006 | Ziegler |
| 2006/0190569 A1 | 8/2006 | Neil et al. |
| 2006/0236384 A1 | 10/2006 | Lindholm et al. |
| 2007/0179883 A1 | 8/2007 | Questembert |
| 2007/0179942 A1 | 8/2007 | Heggem |
| 2007/0198432 A1 | 8/2007 | Pitroda et al. |
| 2007/0225047 A1 | 9/2007 | Bakos |
| 2007/0255662 A1 | 11/2007 | Tumminaro |
| 2007/0289002 A1 | 12/2007 | van der Horst et al. |
| 2008/0051059 A1 | 2/2008 | Fisher |
| 2008/0052192 A1 | 2/2008 | Fisher |
| 2008/0052233 A1 | 2/2008 | Fisher et al. |
| 2008/0120129 A1 | 5/2008 | Seubert et al. |
| 2008/0162361 A1 | 7/2008 | Sklovsky et al. |
| 2008/0183628 A1 | 7/2008 | Oliver et al. |
| 2008/0243784 A1 | 10/2008 | Stading |
| 2008/0249931 A1 | 10/2008 | Gilder et al. |
| 2008/0250246 A1 | 10/2008 | Arditti et al. |
| 2009/0037308 A1 | 2/2009 | Feinstein |
| 2009/0070257 A1 | 3/2009 | Csoka |
| 2009/0157555 A1 | 6/2009 | Biffle et al. |
| 2009/0222900 A1 | 9/2009 | Benaloh et al. |
| 2009/0228779 A1 | 9/2009 | Williamson et al. |
| 2009/0245521 A1 | 10/2009 | Vembu et al. |
| 2009/0271847 A1 | 10/2009 | Karjala et al. |
| 2009/0328177 A1 | 12/2009 | Frey et al. |
| 2010/0027552 A1 | 2/2010 | Hill |
| 2010/0043054 A1 | 2/2010 | Kidwell |
| 2010/0049850 A1 | 2/2010 | Nanduri et al. |
| 2010/0169072 A1 | 7/2010 | Zaki et al. |
| 2010/0185868 A1 | 7/2010 | Grecia |
| 2010/0205065 A1 | 8/2010 | Kumar et al. |
| 2010/0223160 A1 | 9/2010 | Brown |
| 2010/0235882 A1 | 9/2010 | Moore |
| 2010/0313255 A1 | 12/2010 | Khuda |
| 2010/0325710 A1 | 12/2010 | Etchegoyen |
| 2011/0055079 A1 | 3/2011 | Meaney et al. |
| 2011/0196790 A1 | 8/2011 | Milne |
| 2011/0238550 A1 | 9/2011 | Reich et al. |
| 2011/0247060 A1 | 10/2011 | Whitmyer, Jr. |
| 2011/0295731 A1 | 12/2011 | Waldron, III et al. |
| 2012/0059706 A1 | 3/2012 | Goenka et al. |
| 2012/0116880 A1 | 5/2012 | Patel et al. |
| 2012/0129503 A1 | 5/2012 | Lindeman et al. |
| 2012/0191603 A1 | 7/2012 | Nuzzi |
| 2012/0209775 A1 | 8/2012 | Milne |
| 2012/0215688 A1 | 8/2012 | Musser et al. |
| 2012/0233212 A1 | 9/2012 | Newton et al. |
| 2012/0246073 A1 | 9/2012 | Gore et al. |
| 2012/0253876 A1 | 10/2012 | Hersch |
| 2012/0278201 A1 | 11/2012 | Milne |
| 2012/0281058 A1 | 11/2012 | Laney et al. |
| 2012/0284175 A1 | 11/2012 | Wilson et al. |
| 2012/0323717 A1 | 12/2012 | Kirsch |
| 2013/0019297 A1 | 1/2013 | Lawson et al. |
| 2013/0041736 A1 | 2/2013 | Coppinger |
| 2013/0041739 A1 | 2/2013 | Coppinger |
| 2013/0041744 A1 | 2/2013 | Coppinger |
| 2013/0046599 A1 | 2/2013 | Coppinger |
| 2013/0097685 A1 | 4/2013 | Kennedy et al. |
| 2013/0125223 A1 | 5/2013 | Sorotokin et al. |
| 2013/0174015 A1 | 7/2013 | Jeff L. |
| 2013/0191526 A1 | 7/2013 | Zhao |
| 2013/0232006 A1 | 9/2013 | Holcomb et al. |
| 2013/0232159 A1 | 9/2013 | Daya et al. |
| 2013/0247005 A1 | 9/2013 | Hirsch et al. |
| 2013/0282577 A1 | 10/2013 | Milne |
| 2013/0318592 A1 | 11/2013 | Grier, Sr. et al. |
| 2014/0006244 A1 | 1/2014 | Crowley et al. |
| 2014/0032414 A1 | 1/2014 | Beisner et al. |
| 2014/0040148 A1 | 2/2014 | Ozvat et al. |
| 2014/0044123 A1 | 2/2014 | Lawson et al. |
| 2014/0067499 A1 | 3/2014 | Stepanovich |
| 2014/0150072 A1 | 5/2014 | Castro et al. |
| 2014/0165156 A1 | 6/2014 | Fushman et al. |
| 2014/0173695 A1 | 6/2014 | Valdivia |
| 2014/0180962 A1 | 6/2014 | Fiala et al. |
| 2014/0189002 A1 | 7/2014 | Oriolo et al. |
| 2014/0189808 A1 | 7/2014 | Mahaffey et al. |
| 2014/0189828 A1 | 7/2014 | Baghdasaryan et al. |
| 2014/0208389 A1 | 7/2014 | Kelley |
| 2014/0215551 A1 | 7/2014 | Allain et al. |
| 2014/0229462 A1 | 8/2014 | Lo |
| 2014/0236716 A1 | 8/2014 | Shapiro et al. |
| 2014/0245411 A1 | 8/2014 | Meng et al. |
| 2014/0258063 A1 | 9/2014 | Chourasia et al. |
| 2014/0280555 A1 | 9/2014 | Tapia et al. |
| 2014/0344141 A1 | 11/2014 | Cook |
| 2014/0358704 A1 | 12/2014 | Banerjee et al. |
| 2014/0365350 A1 | 12/2014 | Shvarts |
| 2015/0026024 A1 | 1/2015 | Calman et al. |
| 2015/0046338 A1 | 2/2015 | Laxminarayanan et al. |
| 2015/0066719 A1 | 3/2015 | Agrawal et al. |
| 2015/0066765 A1 | 3/2015 | Banks et al. |
| 2015/0088707 A1 | 3/2015 | Drury et al. |
| 2015/0088732 A1 | 3/2015 | DeVan, Jr. et al. |
| 2015/0113511 A1 | 4/2015 | Poulin |
| 2015/0161608 A1 | 6/2015 | Gilbert et al. |

(56) References Cited

U.S. PATENT DOCUMENTS

| | | |
|---|---|---|
| 2015/0193871 A1 | 7/2015 | Murphy |
| 2015/0254672 A1 | 9/2015 | Huesch et al. |
| 2015/0281225 A1 | 10/2015 | Schoen et al. |
| 2015/0310562 A1 | 10/2015 | Chourasia et al. |
| 2015/0339664 A1 | 11/2015 | Wong et al. |
| 2015/0365399 A1 | 12/2015 | Biswas et al. |
| 2016/0063657 A1 | 3/2016 | Chen et al. |
| 2017/0118301 A1 | 4/2017 | Kouru et al. |
| 2017/0132633 A1 | 5/2017 | Whitehouse |
| 2017/0148021 A1 | 5/2017 | Goldstein et al. |
| 2017/0193112 A1 | 7/2017 | Desineni et al. |
| 2017/0193486 A1 | 7/2017 | Parekh |
| 2017/0200137 A1 | 7/2017 | Vilmont |
| 2017/0200234 A1 | 7/2017 | Morse et al. |
| 2017/0262840 A1 | 9/2017 | Dunwoody |
| 2017/0300960 A1 | 10/2017 | Khvostov et al. |
| 2017/0301013 A1 | 10/2017 | Alejo et al. |
| 2017/0308902 A1 | 10/2017 | Quiroga et al. |
| 2018/0060927 A1 | 3/2018 | Gupta |
| 2018/0157851 A1 | 6/2018 | Sgambati et al. |
| 2018/0191685 A1 | 7/2018 | Bajoria |
| 2018/0196694 A1 | 7/2018 | Banerjee et al. |
| 2018/0232734 A1 | 8/2018 | Smets et al. |
| 2018/0246943 A1 | 8/2018 | Avagyan et al. |
| 2018/0267847 A1 | 9/2018 | Smith et al. |
| 2018/0267874 A1 | 9/2018 | Keremane et al. |
| 2018/0330342 A1 | 11/2018 | Prakash et al. |
| 2018/0349909 A1 | 12/2018 | Allen et al. |
| 2018/0367428 A1 | 12/2018 | Di Pietro et al. |
| 2019/0075115 A1 | 3/2019 | Anderson et al. |
| 2019/0180364 A1 | 6/2019 | Chong et al. |
| 2019/0333159 A1 | 10/2019 | Chourasia et al. |
| 2019/0354544 A1 | 11/2019 | Hertz et al. |
| 2020/0106764 A1 | 4/2020 | Hockey et al. |
| 2020/0110585 A1 | 4/2020 | Perry |
| 2020/0201878 A1 | 6/2020 | Putnam et al. |
| 2020/0234376 A1 | 7/2020 | Lord et al. |
| 2021/0004439 A1 | 1/2021 | Xiong et al. |
| 2021/0165960 A1 | 6/2021 | Eisenschlos et al. |
| 2021/0217016 A1 | 7/2021 | Putnam |
| 2021/0233162 A1 | 7/2021 | Hockey et al. |
| 2021/0281558 A1 | 9/2021 | Hockey et al. |
| 2021/0288956 A1 | 9/2021 | Hockey et al. |
| 2021/0350340 A1 | 11/2021 | Lai et al. |
| 2022/0217147 A1 | 7/2022 | Pate et al. |
| 2022/0229980 A1 | 7/2022 | Jin et al. |
| 2022/0327141 A1 | 10/2022 | Putnam et al. |

FOREIGN PATENT DOCUMENTS

| | | |
|---|---|---|
| EP | 848339 A1 | 6/1998 |
| EP | 2747374 A1 | 6/2014 |
| EP | 3347846 A1 | 7/2018 |
| WO | 96/38795 A1 | 12/1996 |
| WO | 97/09682 A1 | 3/1997 |
| WO | 97/10542 A1 | 3/1997 |
| WO | 97/26612 A1 | 7/1997 |
| WO | 97/37314 A1 | 10/1997 |
| WO | 98/14896 A1 | 4/1998 |
| WO | 00/25227 A1 | 5/2000 |
| WO | 2017/044479 A1 | 3/2017 |
| WO | 2017/173021 A1 | 10/2017 |
| WO | 2022/082186 A1 | 4/2022 |

OTHER PUBLICATIONS

Mohammed et al. A Multi-layer of Multi Factors Authentication Model for Online Banking Services, Oct. 15, 2013, 2013 International Conference on Computing, Electrical and Electronic Engineering (ICCEEE), pp. 220-224.

Neville, S.W. et al. Efficiently Archieving Full Three-Way Non-repudation in Consumer-level eCommerce and M-Commerce Transactions, Nov. 1, 2011 IEEE 10th International Conference on Trust, Security and Privacy in computing and Communications, pp. 664-672.

Optimizing Information Agents by Selectively Materializing Data, Naveen Ashish, Craig A. Knoblock, and Cyrus Shahabi. In Proceedings of the AAAI'98 Workshop on AI and Information Integration, Madison, WI, 1998. Jul. 26-30, 1998.

O'Riain et al., "XBRL and open data for global financial ecosystems: A linked data approach," International Journal of Accounting Information Systems 13.2 (2012); 141-162.

Quwalder et al., "Experimental Framework for Mobile Cloud Computing System", Jordan University of Science and Technology, Procedia Computer Science 52, 2015, pp. 1147-1152.

Semi-automatic wrapper generation for Internet Information sources, Naveen Ashish and Craig K. Knoblock, In Proceedings of the Second IFCIS International Conference on Cooperative Information Systems, Kaiwah Island, SC, 1997, Jun. 24-27, 1997.

Sunwoo et al., "A Structured Approach to the Simulation, Analysis and Characterization of Smartphone Applications", IEEE 2013, pp. 113-122.

Supplementary European Search Report in EP Application No. 16844973.4 dated Jan. 4, 2019.

The ariadne approach to web-based information integration, Craig A. Knoblock and Steven Minton, IEEE Intelligent Systems, 15(5), Sep./Oct. 1998.

Naveen Ashish and Craig A. Knoblock, In Proceedings of the Workshop in Management of Semistructured Data, Tucson, AZ, 1997, May 13-15, 1997.

Ion Muslea, Steven Minton, and Craig A. Knoblock, In Proceedings of the Conference on Automated Learning and Discovery Workshop on Learning from Text and the Web, Pittsburgh, PA, 1998, Jun. Nov. 13, 1998.

Y. Zhao, "WebEntree: A Web Service Aggregator", IBM Systems Journal, vol. 37, No. 4, 1998, pp. 584-595, 1998.

"A Single Login Web Service Integrator—WebEntrance", Yan Zhao, Sixth International World Wide Web Conference, Santa Clara, CA, Apr. 7-11, 1997.

Automatic notification of Web Sites Changes,: Google Groups, Aug. 30, 1995.

"Boeing Chooses NetMind Enterprise Minder to Help Thousands of Employees Track Web-Based Information," PR Newswire, Nov. 19, 1998.

"Caravelle's InfoWatcher 1.1 Keeps an Eye on the Web," PC Week 1997.

"Cognisoft Announces IntelliServ, A Revolutionary Intranet Information Management Application; a Powerful Solution that Enables the Right Information to Find the Right User at the Right Time," Business Wire, p. 8140125, Aug. 14, 1996.

"FirstFloor and Air Media Announce Parnership," Business Wire 1997 ("FirstFloor").

"Fujitsu Announces Availability of ByeDesk Link for Alpha-Numeric pagers; Next Step in Empowering Mobile Workforces with 'Anyplace, Anytime' Information," Business Wire, Jul. 9, 1998.

"Fujitsu Announces 'WebAgent' Application as part of ByeDesk Link Wireless Server Software," Business Wire, Sep. 1, 1998.

"Fujitsu Picks Netmind for Wireless Web Agent Software," Computergram International, Sep. 2, 1998.

"Fujitsu's ByeDesk Link Now Available On the PalmPilot," Business Wire, Sep. 21, 1998.

"GC Tech's GlobeID Payment Internet Commerce Software Supports Microsoft, Merchant Server," Business Wire, Jan. 21, 1997, p. 1211286.

"Highly Scalable On-Line Payments via Task Decoupling," Financial Cryptography First Internationl Conference, 1998, p. 355-373.

"Minding Web Site Changes," PC Week, Sep. 14, 1998.

"NetMind Accepts $7 Million Strategic Investment From Three Prominent VC Firms—BancBoston, SOFTBANK and Draper Fisher Jurvestson,"PR Newswire, Nov. 6, 1998.

"NetMind Updates the World's Largest Free Web Tracking Service,"PR Newswire, Sep. 18, 1998.

"The AT&T Internet Difference Engine: Tracking and Viewing Changes on the Web,"World Wide Web 1 (1); Jan. 1998, pp. 27-44.

"Versatile Intelligent Agents in Commercial Applications," Google Groups, Dec. 12, 1998.

(56) References Cited

OTHER PUBLICATIONS

"Web Interface Definition Language (WIDL)", W3 Consortium submission from webmethods, Inc., Sep. 2, 1997.
A hierarchical approach to wrapper induction, Ion Muslea, Steve Minton and Craig A. Knoblock, In Proceedings of the 3rd International Conference on Autonomous Agents 1999, Seattle, WA, 1999, May 1-5, 1999.
A.H.W. Ding et al., "A distributed framework for mining financial data," 4th IEEE International Conference on Cloud Computing Technology and Science Proceedings, Taipei, Taiwan, 2012, pp. 863-868, doi: 10.1109/CloudCom.2012.6427505. (Year: 2012).
Adam et al., "Backend Server System Design Based on Rest API for Cashless Payment System on Retail Community", International Electronics Symposium (IES), Sep. 2019, pp. 208-213.
Building agents for internet-base supply chain integration, Craig A. Knoblock and Steven Minton. In Proceedings of the Workshop on Agents for Electronic Commerce and Managing the Internet-Enabled Supply Chain, Seattle, WA, 1999, May 1-5, 1999.
Chard et al., "Efficient and Secure Transfer, Synchronization, and Sharing of Big Data", IEEE Cloud Computing, 2014, vol. 1, Issue 3, pp. 46-55.
Chaulagain et al., "Cloud Based Web Scraping for Big Data Application," IEEE International Conference on Smart Cloud, 2017, pp. 138-143.
Corena et al., "Secure and fast aggregation of financial data in cloud-based expense tracking applications," Journal of Network and Systems Management 20.4 (2012); 534-560.
Devlin, J. et al., "BERT: Pre-training of Deep Bidirectional Transformers for Language Understanding," arXive, May 24, 2019, retrieved from the internet, URL: https://arxiv.org/pdf/1810.04805.pdf, 16 pages.
Drury et al., "Systems and Methods of Access Control and System Integration", U.S. Appl. No. 61/881,314, filed Sep. 23, 2013 (Year: 2013).
European Search Report in EP Application No. 21215799.4 dated Mar. 25, 2022, 8 pages.
Examination Report in AU Application No. 2016321166 dated Dec. 7, 2020, 5 pages.
Examination Report in CA Application No. 2997115 dated Nov. 2, 2020, 3 pages.
Examination Report in CA Application No. 2997115 dated Apr. 2, 2020.
Examination Report in CA Application No. 2997115, dated Jun. 20, 2019.
Examination Report in CA Application No. 2997115, dated Nov. 13, 2019.
Examination Report in CA Application No. 3119897 dated Jul. 30, 2021, 6 pages.
Examination Report in EP Application No. 16844973.4 dated Nov. 4, 2020, 6 pages.
Examination Report No. 1 in AU Application No. 2021250924, dated Oct. 25, 2022.
Hagel et al., "The Coming Battle for Customer Information," Harvard Business Review, Jan.-Feb. 1997, reprint No. 97104.
Hummer, Waldemar, Phillipp Leitner, and Schahram Dustdar. "Ws-aggregation; distributed of web services data." Proceedings of the 2011 ACM Symposium on Applied Computing. ACM, 2011.
Intelligent caching for information mediators: A kr based approach, Naveen Ashish, Craig A. Knoblock, and Cyrus Shahabi, In Proceedings of the Workshop on Knowledge Representation meets Databases (KRDB), Seattle, WA, 1998, Presented May 1, 1998.
International Preliminary Report on Patentability in PCT Application No. PCT/US2021/030808, dated Nov. 8, 2022.
International Search Report and Written Opinion in PCT Application No. PCT/US2021/071851, dated Dec. 13, 2021, 10 pages.
International Search Report and Written Opinion in PCT Application No. PCT/US2021/030808, dated Jun. 21, 2021, 11 pages.
International Search Report in PCT Application No. PCT/US2016/050536, dated Dec. 15, 2016.
Jin, C., "How Plaid parses transaction data," Oct. 22, 2020, retrieved from the internet, URL: https://plaid.com/blog/ how-plaid-parsestransaction-data/, 10 pages.
Johner et al., "Sign On with IBM's Global Sign-On!" IBM manual, Nov. 1998, Part 1, in 184 pages.
Kim, Young-Gon et al., A Design of User Authentication System Using QR code Identifying Method, 6th International Conference on Computer Sciences and Convergence Information Technology (ICCIT), pp. 31-35, 2011.
Kyeongwon C., et al., "A Mobile based Anti-Phishing Authentication Scheme using QR code", IEEE International Conference on Mobile IT Convergence, pp. 109-113, 2011.
M.C. McChasney, "Banking in cyberspace: an investment in itself, "IEEE Spectrum, vol. 34, No. 2, Feb. 1997, pp. 54-59.
Mancini et al., "Simulation in the Cloud Using Handheld Devices, " Workshop on Modeling and Simulation on Grid and Cloud Computing, Apr. 25, 2012, 8 pages.
Modeling web sources for information integration, Craig A. Knoblock, Steven Minton, Jose Luis Ambite, Naveen Ashish, Pragnesh Jay Modi, Ion Muslea, Andrew G. Philpot, and Sheila Tejada. In Proceedings of the Fifteenth National Conference on Artifical Intelligence, Madison, WI, 1998. Jul. 26-30, 1998.

* cited by examiner

Proxy Instance User A Bank 1 121

User: "User A"
Institution: "Bank 1 141"
Credentials: <User A Credentials Bank 1>
Properties: <User A Properties Bank 1>

Proxy Instance User A Bank 2 122

User: "User A"
Institution: "Bank 2 142"
Credentials: <User A Credentials Bank 2>
Properties: <User A Properties Bank 2>

Proxy Instance User B Bank 2 123

User: "User B"
Institution: "Bank 2 142"
Credentials: <User B Credentials Bank 2>
Properties: <User B Properties Bank 2>

FIGURE 3

Dev Account B Proxy Instance User A Bank 1 521

Dev Account B User: "User A"
Institution: "Bank 1 441"
Credentials: <User A Credentials Bank 1>
Properties: <User A Properties Bank 1>

Dev Account B Proxy Instance User A Bank 2 522

Dev Account B User: "User A"
Institution: "Bank 2 442"
Credentials: <User A Credentials Bank 2>
Properties: <User A Properties Bank 2>

Dev Account B Proxy Instance User B Bank 2 523

Dev Account B User: "User B"
Institution: "Bank 2 442"
Credentials: <User B Credentials Bank 2>
Properties: <User B Properties Bank 2>

Dev Account A Proxy Instance User C Bank 1 524

Dev Account A User: "User C"
Institution: "Bank 1 441"
Credentials: <User C Credentials Bank 1>
Properties: <User C Properties Bank 1>

Dev Account A Proxy Instance User C Bank 2 525

Dev Account A User: "User C"
Institution: "Bank 2 442"
Credentials: <User C Credentials Bank 2>
Properties: <User C Properties Bank 2>

FIGURE 6

SYSTEM AND METHOD FOR PROGRAMMATICALLY ACCESSING FINANCIAL DATA

CROSS-REFERENCE TO RELATED APPLICATIONS

This application is a continuation of and claims priority to U.S. patent application Ser. No. 17/302,630, filed May 7, 2021, and entitled "System and Method for Programmatically Accessing Financial Data," which is a continuation of and claims priority to U.S. patent application Ser. No. 16/396,505 (now U.S. Pat. No. 11,030,682), filed Apr. 26, 2019, and entitled "System and Method for Programmatically Accessing Financial Data," which is a continuation of U.S. patent application Ser. No. 15/258,299 (now U.S. Pat. No. 10,319,029), filed Sep. 7, 2016, and entitled, "System and Method for Programmatically Accessing Financial Data," which is a continuation of U.S. patent application Ser. No. 14/790,840 (now U.S. Pat. No. 9,449,346), filed Jul. 2, 2015, and entitled, "System and Method for Programmatically Accessing Financial Data," which is a continuation of U.S. patent application Ser. No. 14/719,110, filed May 21, 2015, and entitled, "System and Method for Programmatically Accessing Financial Data," which claims the benefit of U.S. Provisional Application Ser. No. 62/001,452, filed on May 21, 2014, all of which are incorporated herein by reference in their entirety.

TECHNICAL FIELD

This invention relates generally to the financial API field, and more specifically to a new and useful system and method for programmatically accessing financial data in the financial API field.

BACKGROUND

Banks and other financial institutions hold considerable information relating to a user's current financial status and financial history. Such data is often presented through a bank's website or sometimes applications (e.g., mobile applications). However, such tools only provide information about the single institution, and do not combine multiple institutions. Furthermore, such institutions commonly do not expose a public version of an API, providing a large barrier to other parties to solve such a problem. Some online products offer capabilities to merge information from different institutions. One such commonly used approach is to simulate user access of a bank website to access information. There are numerous problems with such solutions. Web-crawling solutions such as these are slow to the end user because full pages have to be rendered and sometimes depend on executing javascript and other user interface simulations. Related to this, such methods are more costly to the financial institutions because numerous web resources are consumed for a given piece of information. Additionally, such a web-crawling approach is highly dependent on the visual representation of the information. A change in the layout or visual representation can break such web crawling. Thus, there is a need in the financial API field to create a new and useful system and method for programmatically accessing financial data. This invention provides such improved/new and useful system and method.

BRIEF DESCRIPTION OF THE FIGURES

FIG. 3 is a representation of exemplary proxy instances of an embodiment;

FIG. 6 is a representation of exemplary proxy instances of an embodiment;

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Programmatically Accessing Financial Data

Figure 1:
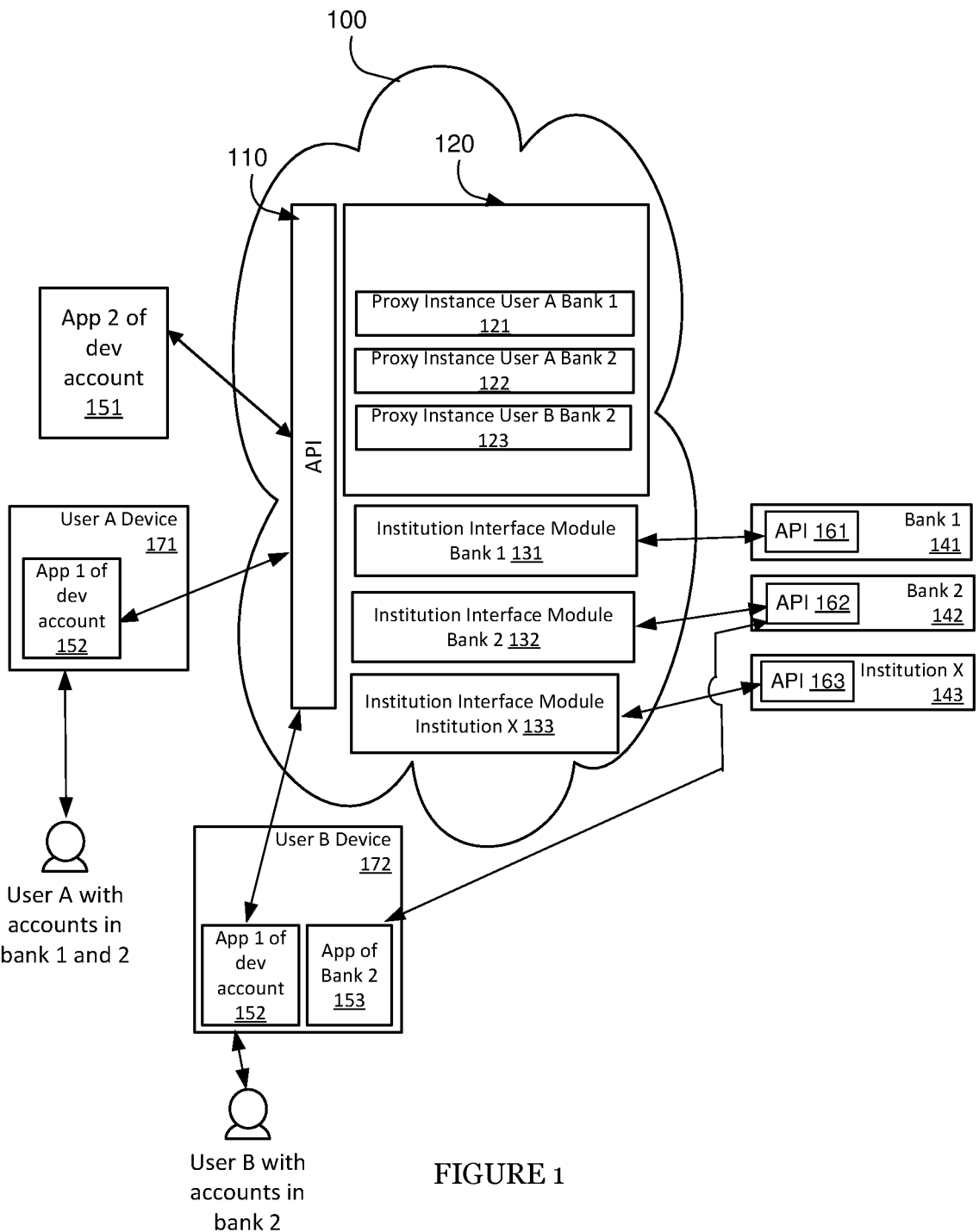
FIG. 1 is a schematic representation of a system of an embodiment.

As shown in FIG. 1, a system 100 for programmatically accessing financial data of a preferred embodiment can include an application programming interface (API) service 110, an application proxy system 120, and at least one institution interface module (e.g., the modules 131-133 of FIG. 1). The system functions to provide programmatic access to an external service (e.g., the services 141-143 of FIG. 1) that lacks exposed programmatic access. The external services are preferably proprietary and external financial services. The external services can include banks, credit card providers, investment services, loan providers, and other suitable financial institutions. Such institutions may have first party applications that enable users to access account information from a mobile or desktop application. Such first party applications will commonly use a proprietary or customized application programming interface (API) (e.g., the APIs 161-163 of FIG. 1). The API is commonly not public and not exposed. For example, a developer is commonly prevented from registering an account and using an open API authentication approach to arbitrarily access the API resources. Additionally, the API (e.g., the APIs 161-163 of FIG. 1) of the institution is a non-trivial customized interface protocol that isn't shared with other institutions—each institution conforms to its own interface. The method can additionally function to provide a normalized interface (e.g., the API service 110 of FIG. 1) to a plurality of external services (e.g., the services 141-143 of FIG. 1). The system 100 enables access to an account within an institution by leveraging the application proxy system 120. A virtualized "image" or digital simulation of an application instance is maintained in the application proxy system 120 and used to access the unexposed API (e.g., 161-163) of the institution. While the system is preferably applied to financial institutions, the system may additionally or alternatively be applied to providing API access to other external entities with closed or limited API access.

The API service 110, which functions to provide a normalized customer/user facing interface. The API interface is preferably normalized in the sense that the underlying API to the external institution (e.g., 141-143) that acts as the source of the information is abstracted away, and the interface to different institution information is substantially similar. In some variations, various aspects of the API 110 may be limited when interfacing with particular institutions. For example, one institution may not support a feature such as digital check deposit, while a second institution does. In this case, the API 110 may define the API such that the API feature for check deposit is prevented for the first institution. The system 100 and more specifically the API service 110 is preferably used to provide an accessible API service to outside developers. As such, the system 100 is preferably a multi-tenant system that allows numerous accounts to share use of the system 100. The system 100 and more particularly the API 110 may alternatively be a single tenant system. For example, the system may be used as an internal system to a website providing an online financial management product.

The API service 110 is preferably a RESTful API but may alternatively be any suitable API such as SOAP or custom protocol. The RESTful API works according to an HTTP request and response model. HTTP requests (or any suitable request communication) to the system 100 preferably observe the principles of a RESTful design. RESTful is understood in this document to describe a Representational State Transfer architecture as is known in the art. The RESTful HTTP requests are preferably stateless, thus each message communicated contains all necessary information for processing the request and generating a response. The API service 110 can include various resources which act as endpoints which act as a mechanism for specifying requested information or requesting particular actions. The resources can be expressed as URI's or resource paths. The RESTful API resources can additionally be responsive to different types of HTTP methods such as GET, PUT, POST and/or DELETE.

The API service 110 can provide an interface into a variety of information and action resources. Information relating to an account is preferably accessible through querying particular API resources. For example, a list of transactions and information about each individual transaction may be accessible through different API calls. Information can additionally relate to account summary information, account details such as address and contact information, information about other parties such as the entities involved in a transaction, and/or any suitable information. The API may additionally be used to trigger or facilitate performing some action. For example, an API call may be used in transferring money, updating account information, setting up alerts, or performing any suitable action. Those skilled in the art will appreciate that such exemplary API features that any suitable API feature possibilities and semantic architecture may be used.

In one exemplary implementation, an API call can support adding a user, completing authentication, accessing transaction information, and other actions. For example, an application may POST to a "/connect" REST API resource to authenticate a user; if the institution includes multi-factor authentication, then a "/connect/step" resource can be submitted to complete multi-factor authentication credentials; and then performing a GET on the "/connect" resource can access transactional data. The API may additionally include informational resources to access information about entities involved in transactions. For example, the API 110 may allow a particular business resource to be accessed to obtain contextual information about the business such as name, location, and classification.

The application proxy system 120 functions to manage the simulation of application access to an institution. The application proxy system 120 operates in cooperation with an institution interface module (e.g., one of the modules 131-133 of FIG. 1) to establish a data model or some data image that acts as a virtualized application instance—an application proxy instance (e.g., 121-123) preferably serves as such a virtualized instance. From the perspective of the institution, the proxy instance (e.g., 121-123) appears as an application (e.g., the Bank 2 application 153 of FIG. 1) installed on a physical user device (e.g., user devices 171 and 172 of FIG. 1) that is being used. In other words, the requests received from the proxy instance are treated like requests from a mobile app, desktop app, or web-based application of a user. The application proxy system 120 preferably stores and maintains a plurality of application proxy instances (e.g., proxy instances 121-123). The proxy instances are preferably configuration settings and properties that when used according to a defined institution interface (e.g., an institution interface of an institution interface module 131-133), will appear as requests from first party applications (e.g., the application 153) of the institution (e.g., 141-143). A different proxy instance is preferably created and maintained for each account-institution pair. A given user may have multiple accounts with different institutions. A proxy instance preferably includes a set of properties that can be used to authenticate the proxy instance with the institution system (e.g., 141-143). The API service 120 preferably provides a method to programmatically create a proxy instance for a user. The user preferably provides some account credentials that can be used in an initial registration of the proxy instance with the API of the institution. The proxy instance may be characterized as a set of properties that can be stored and maintained. Some of those properties may be automatically generated, may be provided from the institution during negotiating registration, may be properties of the application that is being simulated, or include any suitable identifying and authenticating information. The properties may include a unique user identifier code, an authentication token, a MAC address (e.g., a MAC address of a user device 171-172), or any suitable information. When a request is made to a bank on behalf of a user, the properties of the proxy instance are preferably invoked to gain access to the institution on behalf of the associated user.

FIG. 3 depicts exemplary proxy instances 121-123 of FIG. 1. As shown in FIG. 3, User A has accounts in Bank 1 and Bank 2, and User B has accounts in Bank 2. As shown in FIG. 3, each proxy instance includes account credentials and properties.

An institution interface module (e.g., one of the modules 131-133 of FIG. 1) functions to model the internal interface (e.g., 161-163) of at least one application (e.g., the application 153) with an external institution (e.g., 141-143). An institution interface module is preferably established for each institution with which the system 100 can interface. For example, an institution interface module may exist for each bank and/or credit card company that is available in the system. The institution interface module is preferably a set of rules and processes of a particular institution. The institution interface module preferably includes a proxy sub-module that defines how the institution recognizes and/or authenticates a particular application. Some banks may depend on the MAC address of a device (e.g., a MAC address of user devices 171 and 172), some depend on asymmetric cryptography tokens, while others may generate encrypted tokens. The proxy sub-module is preferably used in establishing the proxy instance information. The institution interface module can additionally include institution protocol sub-module, which defines a mapping between provided API 110 functionality and the form and mode of communication with the external institution (e.g., 141-143). The institution protocol sub-module can define the headers, body, and other properties of messages sent to the associated institution. The protocol sub-module may additionally define how data should be processed to form that message. In some cases, the data may be encrypted in a standard or proprietary format, which the protocol sub-module can define. Additionally, the protocol sub-module can define the communication flow to fulfill a request. In some cases, multiple requests may need to be made to complete a request objective. Other aspects of dealing with an interface (e.g., 161-163) of an external institution (e.g., 141-143) may additionally be built into the institution interface module such as multi-factor authentication rules. An institution interface module is preferably constructed based on use of an actual application (e.g., the application 153). The communication and/or the source code can be parsed and analyzed to establish some or all of an institution interface module. In some implementations, source code of a first party application (e.g. the application 153) of an external financial service is parsed and analyzed to establish some or all of an institution interface module for the external financial institution. In some implementations, communication between an external financial service and a first party application (e.g. the application 153) of the external financial service is parsed and analyzed to establish some or all of an institution interface module for the external financial institution.

2. Method for Programmatically Accessing Financial Data

Figure 2:
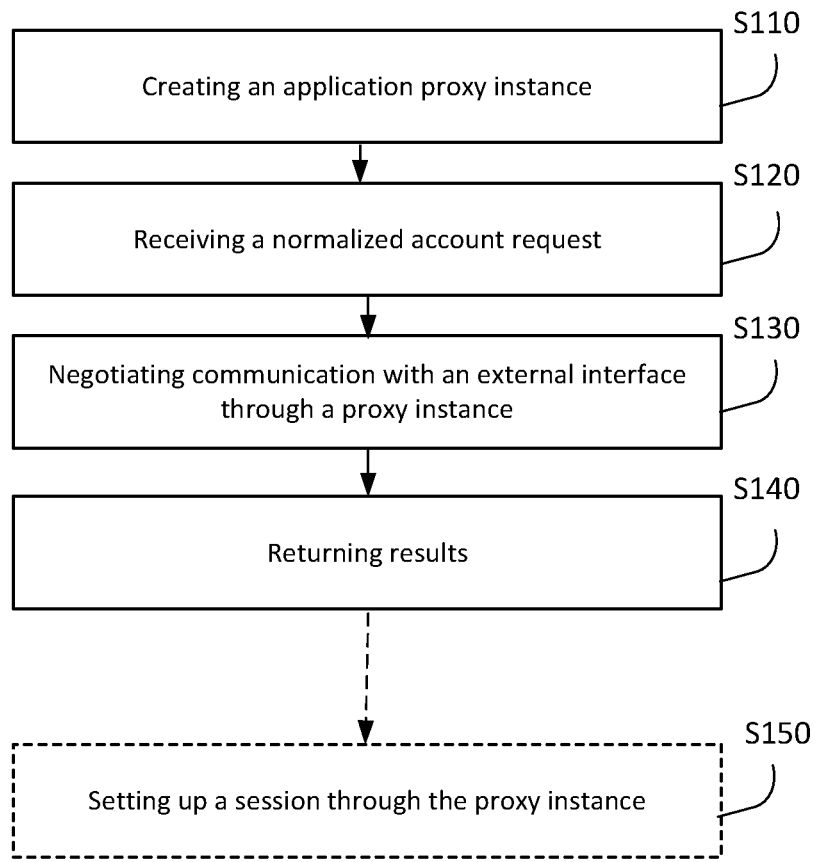
FIG. 2 is a flow diagram of a method of an embodiment.

As shown in FIG. 2, a method for programmatically accessing financial data of a preferred embodiment can include creating an application proxy instance S110, receiving a normalized account request S120, negotiating communication with an external interface through a proxy instance S130, returning results S140. The method functions to provide programmatic access to an external service that lacks exposed programmatic access. The external services are preferably proprietary and external financial services. The external services can include banks, credit card providers, investment services, loan providers, and other suitable financial institutions. Such institutions may have first party applications (e.g., the application 153 of FIG. 1) that enable users to access account information from a mobile or desktop application. Such first party applications will commonly use a proprietary or customized application programming interface (API) (e.g., 161-163 of FIG. 1). The API is commonly not public and not exposed. For example, a developer is commonly prevented from registering an account and using an open API authentication approach to arbitrarily access the API resources. Additionally the API is a non-trivial customized interface protocol that isn't shared with other institutions—each institution conforms to its own interface. The method can additionally function to provide a normalized interface to a plurality of external services (e.g., 141-143 of FIG. 1). The method enables a programmatic interface into an account within an institution by leveraging an application proxy approach. A virtualized "image" or digital simulation of an application instance is maintained in the application proxy system 120 and used to access the unexposed API (e.g., 161-163) of the institution. While the system 100 is preferably applied to financial institutions, the system 100 may additionally or alternatively be applied to providing API access to other external entities with closed or limited API access. The method is preferably implemented through a system as described above (e.g, the system 100 of FIG. 1), but may alternatively be implemented by any suitable system.

Block S110, which includes creating an application proxy instance (e.g., an application proxy instance 121-123 of FIG. 1), functions to establish a digital image of an application instance (e.g., the application instance 153 of FIG. 1) for a selected institution (e.g., the Bank 142 of FIG. 1). Creating an application proxy instances is preferably initiated in response to receiving an initial request. The initial request is initiated by a user (or entity) (e.g., User A or User B of FIG. 1) interacting with a system of a developer account (e.g., a system of the application instances 152 of the user devices 171 and 172 of FIG. 1) and the system of the developer account (e.g., the system of the application instances 152) will then send the initial request to the system 100. The user (e.g., User A and User B of FIG. 1) will preferably have an institution account in a system of the external institution (e.g., an online bank account). An application proxy instance (e.g., 121-123 of FIG. 1) can be created during the initial registration or at a later time, which will provide access to account information of the external institution (e.g., 141-143). Once created, the application proxy instance of that user can be persisted and used at a later time for that given user-institution combination (e.g., "User A-Bank 1", "User A-Bank 2", "User B-Bank 2"). However, a new proxy instance may be created when the proxy instance becomes invalid (e.g., as a result of institution API changes, password/login changes made within the institution, or other reasonable changes to invalidate a proxy instance). The initial request is preferably received through a normalized API (e.g., 110 of FIG. 1) as a connection request. The connection request is preferably accompanied by parameters that specify a selected institution (if there are multiple institution options) and user credentials for the institution. The user credentials may include a username, password, pin code, and/or any suitable credentials. The API request may additionally include authentication credentials such as a client identifier and secret token that is associated with the account in the system.

Creating a proxy instance preferably includes negotiating registration of the proxy instance with the institution, which functions to establish the proxy instance with the selected external institution. An institution interface module (e.g., one of the modules 131-133 of FIG. 1) preferably facilitates navigating the communication handshaking during the initial login. Different institutions may have different processes to register or enroll a new application (which in the method is a proxy instance) such as multi-factor authentication. During the negotiation, various elements may be extracted and stored as part of the proxy instance. Similarly, some properties may be generated based on communication with the institution. For example, a MAC address or a unique device identifier may be used in connecting to the services of the external institution. Such properties are preferably stored as part of the proxy instance.

As mentioned above, multifactor authentication (MFA) may be part of negotiating with an external institution. Frequently, an external institution will respond with indication of a MFA credential requirement. Such MFA requirements are preferably fulfilled by relaying the MFA challenge/task up to a user. In one implementation, the system 100 will receive a message indicating that a security question should be asked to complete the negotiation. The security question is passed back to the associated application, e.g., the applications 151 and 152 of FIG. 1, (which may be operated by a developer account of the system 100), then that application (e.g., the application 152 of FIG. 1) will present the security question in some manner to obtain the user response. The MFA can include security questions, additional pin codes (such as those supplied by a one time password generator or a code transmitted to a secondary device), or any suitable form of MFA.

Block S120, receiving a normalized account request, functions to receive an API request in the format of the system 100. As mentioned above, the syntax and mode of communicating an API request is normalized such that the form is independent of the institution (e.g., one of the institutions 141-143 of FIG. 1). The requests can include a variety of types of requests which may include: Obtaining a list of transactions; requesting details on a particular transaction; performing some financial transfer (moving money from savings to checking, setting up transfer to another account, making scheduled payments, digital deposit of a check, and the like), updating account information (e.g., updating contact information, changing password, manage alerts, and the like), and/or requesting services (e.g., new cards, reporting fraud, and the like). A normalized account request is preferably mapped to an institution interface module (e.g., one of the institution interface modules 131-133 of FIG. 1) or other suitable component that defines communication to fulfill the API request.

Block S130, which includes negotiating communication with an external interface (e.g., one of APIs 161-163) through a proxy instance (e.g., one of the proxy instances 121-123) functions to execute and manage communication between the system 100 and an external institution system (e.g., a 141-143) when fulfilling an account request. The proxy instance (e.g., one of the proxy instances 121-123) preferably provides a mechanism through which access will be granted. The communication is preferably executed while an authenticated session is active. Communication sessions may be expired by the system 100 or the external institution (e.g., a 141-143) for various reasons such as remaining inactive for a set amount of time. A communication session may be active subsequent to enrolling a proxy instance or may require setting up a session through the proxy instance as described below.

Negotiating communication preferably includes creating requests that conform to expected messages of the external institution (e.g., a 141-143). This can include setting headers, body contents, and other message properties. An institution is preferably expecting particular headers. For example, the headers may include a host or path, a data, content type, cookies, MAC address, a user identifier, auth properties, or other suitable headers. Creating requests can additionally include transforming request properties into expected form, which may primarily include applying a set encryption pattern to a request. In one variation, transforming the request involves encrypting content according to a public key, wherein the public key may be stored as part of the proxy instance. The institutions may take varying approaches to how information is communicated. In an alternative institution, the contents of a message may be unencrypted; in which case, the contents are submitted in a plaintext, unencrypted form. In addition to creating requests that conform to expected messages of the external institution, the method can include following a request-response pattern. That pattern can involve a single request and response, but may alternatively include a sequence of different request and responses to obtain desired information.

In some variations, information or actions may not be available through the first proxy instance and so the method may include automatically switching to a second proxy instance with supported functionality. For example, full bank statements may not be available in a mobile application, and the institution API (e.g., one of 161-163 of FIG. 1) may not include such functionality. Accordingly, when that functionality is required to fulfill an API request, then a second proxy interface may be used. In some variations, an API request may be require multiple institutions to be queried. Such an API request may be particularly useful for summarizing financial statements across multiple accounts. The method can include negotiating communication for multiple institutions and combining results into a combined form.

Block S140, which includes returning results, functions to deliver the results as a response to the request. Returning the results preferably includes transforming the data obtained from the external institution into a normalized form. The information is preferably formatted into a standardized format that is substantially similar in representation between different institutions served by the system 100. Transforming the data can additionally include processing, supplementing, and/or otherwise enhancing information. Some information provided by an institution may be poorly formed. For example, store information for a particular transaction may be poorly labeled and may be represented different from other institutions. Such contextual information about external entities can preferably cleaned and supplemented with additional information. For example, an entity may be supplemented with categorical labels, tags, geo location information, and/or other suitable information. The returned results can be represented data format such as JSON, XML, or any suitable format.

The method can additionally include setting up a session through the proxy instance S150, functions to facilitate accessing information after negotiating a proxy instance for an account and institution. The proxy instance (e.g., 121-123 of FIG. 1) will preferably store and maintain information required for subsequent access. The institutions will commonly restrict access to set sessions, which may expire after some amount of time or may require reconfirming user credentials. So when an API request for an account occurs after a communication session has expired then the method preferably automatically sets up a new session using the previous user credentials and proxy instance credentials. In some variations, MFA challenges, such as security questions, may be automatically completed.

The method can additionally include re-capturing updated credentials, which functions to update user credentials for an institution. Updated credentials are preferably updated when a user changes them within the institution or when the proxy instance is otherwise locked out of the account. An error will preferably occur indicating that a communication session was not successful, and then an API request can be submitted to update a proxy instance with new credentials.

3. Financial Platform System

Figure 4:
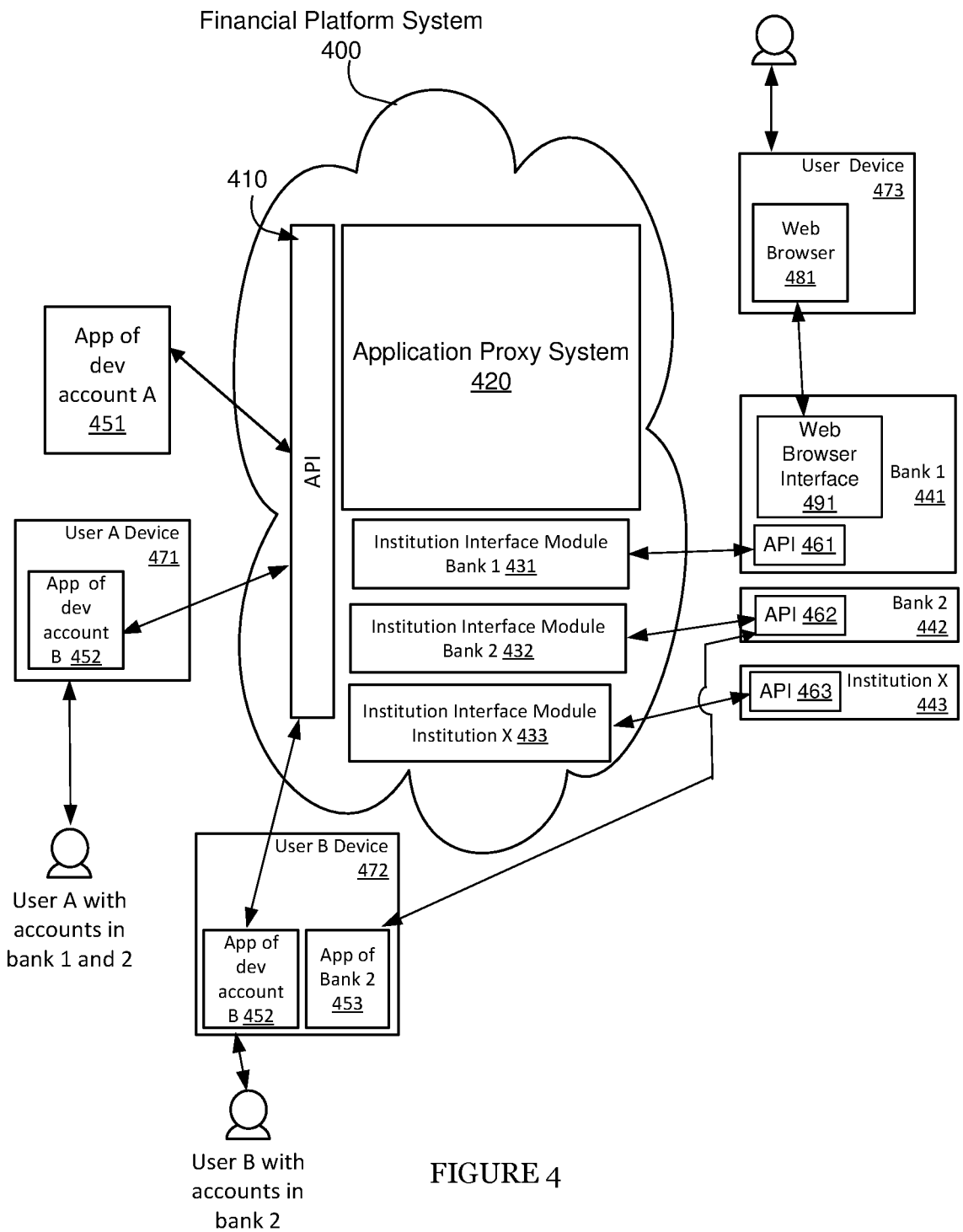
FIG. 4 is a schematic representation of a system of an embodiment.

As shown in FIG. 4, a multi-tenant financial platform system 400 of an embodiment includes an application programming interface (API) service 410, an application proxy system 420, and at least one institution interface module (e.g., the modules 431-433 of FIG. 4). The API service 410, application proxy system 420, and institution interface modules 431-433 of FIG. 4 are similar to the API service 110, application proxy system 120, and institution interface modules 131-133 of FIG. 1.

Figure 7:
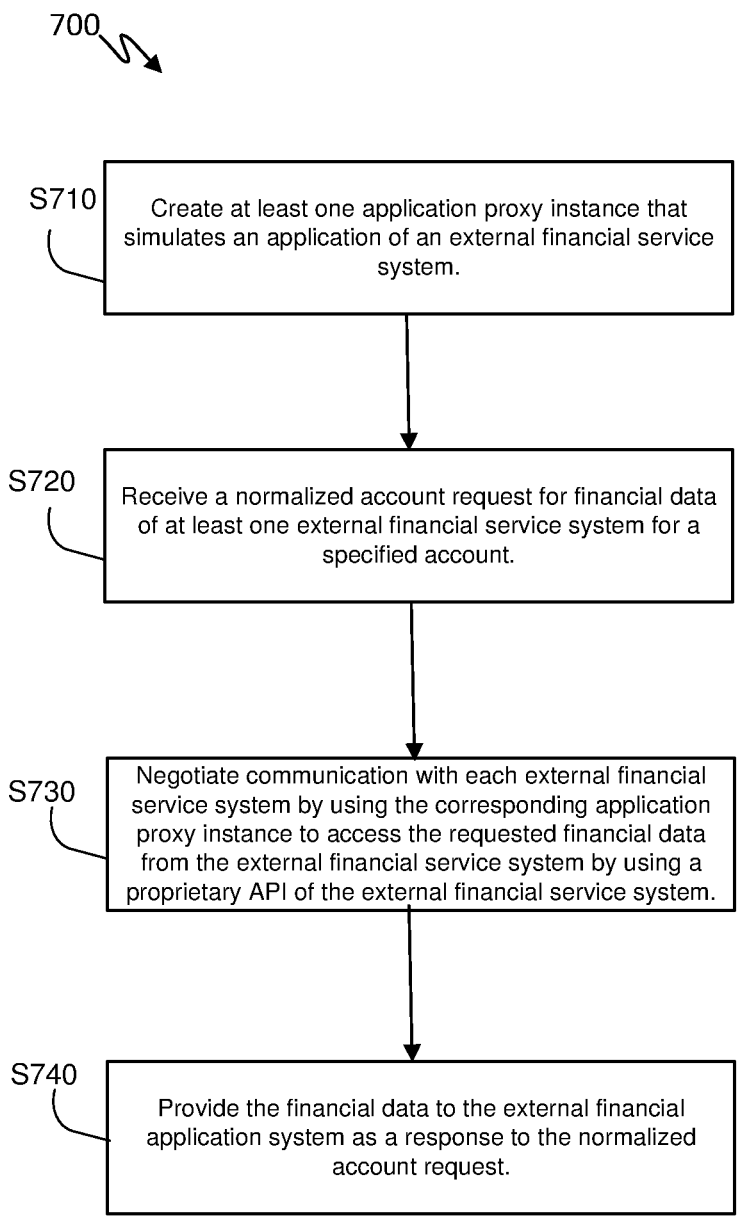
FIG. 7 is a flow diagram of a method of an embodiment.
Figure 8:
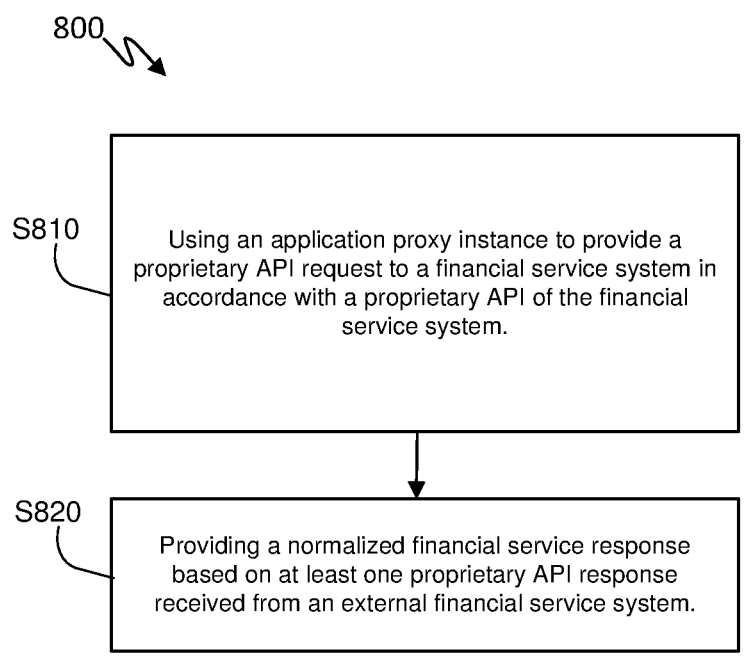
FIG. 8 is a flow diagram of a method of an embodiment.

As shown in FIG. 4, the financial service system 441 includes a public Web browser interface 491 for accessing the financial service system 441 via a Web Browser (or any suitable Web client) (e.g., the web browser 481 of the user device 473). As described below for FIGS. 7 and 8, the methods of FIGS. 7 and 8 provide access to the financial service system 441 via a private, proprietary API (e.g., 461), as opposed to access via the public Web browser interface 491. In some implementations, the Web browser interface 491 is a web server that hosts a web site for access of the financial system via a Web browser over the Internet.

Figure 5:
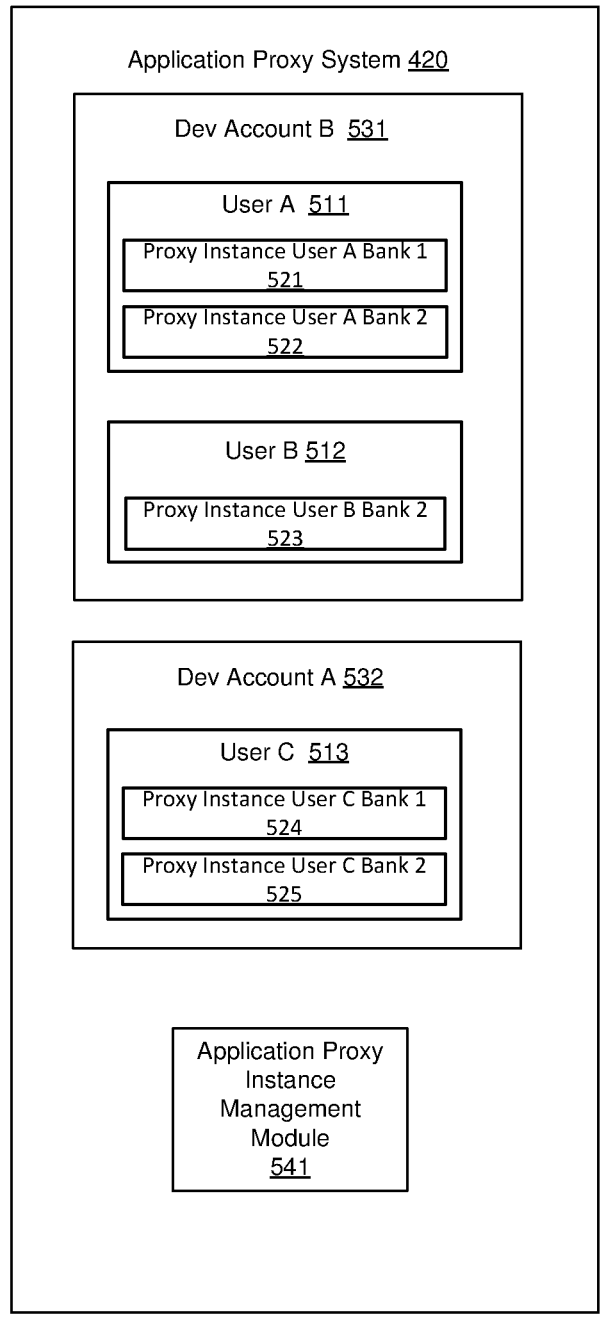
FIG. 5 is a representation of an application proxy system of an embodiment.

As shown in FIG. 5, the application proxy system 420 includes application proxy instances (e.g., proxy instances 521-525) for user accounts (e.g., user accounts 511, 512 and 513) of developer accounts (e.g., Dev Account B 531 and Dev Account A 532) at the financial platform system 400. The application proxy system 420 includes an application proxy instance management module 541 that is constructed to generate application proxy instances, configure application proxy instances, and remove application proxy instances.

In some implementations, each application proxy instance (e.g., proxy instances 521-525), specifies the developer account, the user account of the developer account, the associated financial service system (e.g., "Institution"), and credentials of the user account for the financial service system, as shown in FIG. 6. In some implementations, each application proxy instance specifies properties of the application proxy instance. In some implementations, properties include one or more of a unique user identifier code, an authentication token, a MAC address (e.g., a MAC address of a user device 471-472), or any suitable information.

4. Method for Accessing Financial Data

As shown in FIG. 7, a method 700 for accessing financial data includes: creating at least one application proxy instance (e.g., a proxy instance 521-525 of FIG. 5) that simulates an application (e.g., application 453 of FIG. 4) of an external financial service system (e.g., an external financial service system 441-443 of FIG. 4) (process S710); receiving a normalized API account request for financial data of at least one external financial service system for a specified account, the normalized API account request being provided by an external financial application system (e.g., a financial application system of the application 452 of FIG. 4) by using a normalized financial data API (e.g., API 410 of FIG. 4) of the financial platform system (process S720). Responsive to the normalized API account request (of the process S720): communication is negotiated with each external financial service system (of the normalized account request) by using the respective application proxy instance to access the requested financial data from the external financial service system by using a proprietary Application Programming Interface (API) (e.g., one of the proprietary APIs 461-463 of FIG. 4) of the external financial service system (process S730); and the financial data is provided to the external financial application system as a response to the normalized account request (process S740).

In the example embodiment of FIG. 7, the method 700 is implemented by the financial platform system 400. In the example embodiment, the financial platform system is constructed to programmatically access financial data as described herein for the method 700.

4.1 Creating an Application Proxy Instance

Process S710, which includes creating an application proxy instance that simulates an application of an external financial service system, functions to control the application proxy instance management module 541 of FIG. 5 to create an application proxy instance. In some implementations, the application proxy instance management module 541 creates the application proxy instance as described above for the process S110 of FIG. 1.

In some implementations, the application proxy instance management module 541 creates the application proxy instance responsive to a request to create an application proxy instance. In some implementations, the request to create an application proxy instance specifies information identifying an external financial service system, and a user account of an external application system (e.g., a user account of an external application system of the application 452 of FIG. 4). In some implementations, the request to create an application proxy instance specifies user credentials for the financial service system. In some implementations, the request to create an application proxy instance specifies information identifying an account of the financial platform system 400 associated with the external application system. In some implementations, the request to create an application proxy instance specifies properties for the application proxy instance. In some implementations, properties for the application proxy instance include at least one of a unique user identifier code, an authentication token, a MAC address (e.g., a MAC address of a user device 471-472), financial accounts of the corresponding financial service system, and any other suitable information.

In some implementations, the application proxy instance management module 541 stores the created application proxy instance in association with a user account (e.g., "User A" 511 of FIGS. 5 and 6) of an external application system (e.g., a user account of an external application system of the application 452 of FIG. 4). In some implementations, the application proxy instance management module 541 stores the created application proxy instance in association with an account (e.g., "Dev Account B" 531 of FIGS. 5 and 6) of the financial platform system 400 associated with an external application system (e.g., an external application system of the application 452 of FIG. 4). In some implementations, the application proxy instance management module 541 stores the created application proxy instance (e.g., "Proxy Instance User A Bank 1" 521 of FIGS. 5 and 6) in association with an account (e.g., "Dev Account B" 531) of the financial platform system 400 associated with an external application system, and a user account (e.g., "User A" 511) of the application system. In some implementations, the application proxy instance management module 541 stores the created application proxy instance in association with an account of the financial platform system 400 associated with an external application system, a user account of the application system, and information identifying the financial service system (e.g., "Bank 1 441" of FIG. 6) of the application proxy instance. In some implementations, the application proxy instance management module 541 stores the created application proxy instance in association with an account of the financial platform system 400 associated with an external application system, a user account of the application system, information identifying the financial service system of the application proxy instance, and information identifying financial accounts of the application proxy instance.

In some implementations, creating the application proxy instance includes controlling the application proxy instance management module 541 to construct the application proxy instance to simulate communication of an application (e.g., application 453 of FIG. 4) (of the external financial service system of the application proxy instance) with the financial service system on behalf of the user account (e.g., "User A", "User B") of the application system.

In some implementations, creating the application proxy instance includes controlling the application proxy instance management module 541 to register the created application proxy instance with the external financial service system.

In some implementations, creating the application proxy instance includes controlling the application proxy instance management module 541 to negotiate registration of the application proxy instance with the financial service system (e.g., institution) as described above for the process S110 of FIG. 1.

In some implementations, the request to create an application proxy instance is provided by an external application system (e.g., an external application system of the application 452 of FIG. 4). In some implementations, the request to create an application proxy instance is provided by an external application system (e.g., an external application system of the application 452 of FIG. 4) responsive to user input received at a user device (e.g., 471, 472) executing machine-readable instructions of an application (e.g., 452 of FIG. 4) of the application system.

4.2 Accessing Financial Data

Process S720, which includes receiving a normalized API account request for financial data, functions to control the financial platform system 400 to receive the normalized API account request by using the normalized API 410 of the financial platform system 400. In the example embodiment, the application proxy system 420 includes application proxy instances for each financial service system corresponding to the normalized API account request for financial data. Each application proxy instance is an application proxy instance that is created as described above for the process S710.

In an implementation, receiving a normalized API account request for financial data includes determining whether the application proxy system 420 includes application proxy instances for each financial service system corresponding to the normalized API account request for financial data, and responsive to a determination that the application proxy system 420 does not include an application proxy instance for a financial service system of the normalized API account request for financial data, the financial platform system 400 provides a normalized API account response to the application system that has provided the normalized API account request for financial data. The normalized API account response prompts the application system (e.g., the system of the application 452) to provide a normalized API create request to create an application proxy instance for a financial service system identified in the normalized API account response. In some implementations, the application system provides the normalized API create request to create the application proxy instance as described above for the process S710.

In some implementations, the normalized API account request is a request in accordance with the normalized financial data API (e.g., 410) of the financial platform system 400, and the normalized financial data API is constructed to provide a normalized interface for accessing financial data from external financial service systems (e.g., 441-443) having different proprietary APIs (e.g., 461-463).

4.2.1 Request Parameters

In some implementations, the normalized API account request for financial data specifies a user account (e.g., "User A", "User B") of an external application system (e.g., a user account of an external application system of the application 452 of FIG. 4). In some implementations, the normalized API account request for financial data specifies information identifying an account (e.g., "Dev Account A", "Dev Account B") of the financial platform system 400 associated with the external application system (e.g., an external application system of the application 452 of FIG. 4). In some implementations, the normalized API account request for financial data specifies information identifying an external financial service system (e.g., "Bank 1", "Bank 2"). In some implementations, the normalized API account request for financial data specifies information identifying an account of an external financial system. In some implementations, the normalized API account request for financial data specifies information identifying a transaction of an account of a financial data system. In some implementations, the normalized API account request for financial data specifies parameters. In some implementations, the financial platform system 400 accesses financial data from at least one external financial system by using the parameters. In some implementations, the financial platform system 400 processes financial data accessed from at least one external financial system by using the parameters.

4.2.2 Request for Financial Data of all Accounts

In some implementations, the normalized API account request for financial data is a request for financial data of financial accounts of all financial service systems corresponding to application proxy instances for a user account (e.g., "User A", "User B" of FIGS. 4-6) specified in the request. For example, is a user of the user account has financial accounts at multiple financial service systems, such a request would access financial data for all the financial accounts of the user.

4.2.3 Request for Financial Data of Specified Financial Service System

In some implementations, the normalized API account request for financial data is a request for financial data of financial accounts of a financial service system (e.g., "Bank 1", "Bank 2" of FIGS. 4-6) specified in the request.

4.2.4 Request for Financial Data of Specified Account

In some implementations, the normalized API account request for financial data is a request for financial data of an account of a financial service system, and information identifying the account (e.g., an account number) and the financial service system (e.g., "Bank 1", "Bank 2" of FIGS. 4-6) is specified in the request.

4.2.5 Request for Details of Specified Account Transaction

In some implementations, the normalized API account request for financial data is a request for detailed financial data of an account transaction of an account of a financial service system, and information identifying the transaction (e.g., a credit card purchase, a transfer, a check entry, and the like), the account and the financial service system is specified in the request.

4.3 Negotiating Communication

Process S730, which includes negotiating communication with each external financial service system, functions to control the application proxy system 420 to use a respective application proxy instance to access the requested financial data from an external financial service system by using a proprietary API.

In some implementations, in the case of a normalized API account request for financial data of financial accounts of all financial service systems corresponding to application proxy instances for a user account (e.g., "User A", "User B") specified in the request, the application proxy system 420 uses application proxy instances stored by the application proxy system 420 in association with the specified user account (e.g., "User A", "User B", as shown in FIGS. 5 and 6).

In some implementations, in the case of a normalized API account request for financial data of financial accounts of a financial service system specified in the request, the application proxy system 420 uses application proxy instances stored by the application proxy system 420 in association with the specified user account (e.g., "User A") and the specified financial service system (e.g., "Bank 1").

In some implementations, in the case of a normalized API account request for financial data of an account of a financial service system, the application proxy system 420 uses application proxy instances stored by the application proxy system 420 in association with the specified user account and the specified financial service system.

In some implementations, in the case of a normalized API account request for detailed financial data of an account transaction of an account of a financial service system, the application proxy system 420 uses application proxy instances stored by the application proxy system 420 in association with the specified user account and the specified financial service system.

In some implementations, negotiating communication with a financial service system includes forming a proprietary API request in accordance with the proprietary API (e.g., 461-463 of FIG. 4) based on information specified by the normalized API account request (e.g., account information, transaction information, parameters, and the like).

As described above, the financial platform system 400 includes an institution interface module (e.g., an institution interface module 431-433 of FIG. 4) for each external financial service system (e.g., 441-443), and the institution interface module models the proprietary API (e.g., 461-463) of the external financial service system. In the example embodiment, each application proxy instance (e.g., 521-525) uses the institution interface module (e.g., 431-433 of FIG. 4) corresponding to the financial service system (e.g., 441-443) of the application proxy instance (e.g., 521-525) to access the requested financial data from the external financial service system in accordance with the proprietary API (e.g., 461-463) of the external financial service system.

In some implementations, the financial platform system 400 generates each institution interface module (e.g., 432) by at least one of: parsing source code of the application (e.g., the application 453 of FIG. 4) of the external financial service system, and parsing communication between the application (e.g., 453) and the external financial service system (e.g., 442). In some implementations, each institution interface module defines headers of messages sent to the corresponding external financial service system.

4.4 Providing Financial Data to the Application System

Process S730, which includes providing financial data to the external financial application system as a response to the normalized API account request, functions to control the application proxy system 420 to provide the financial data received by negotiating communication with each external financial service system associated with the normalized API account request.

In some implementations, providing the financial data includes transforming the received financial data into a normalized form. In some implementations, providing the financial data includes transforming the received financial data based on parameters of the normalized API account request. In some implementations, transforming the received financial data includes at least one of processing the financial data, cleaning the financial data, supplementing the financial data with additional information, and enhancing the financial data. In some implementations, additional information includes at least one of categorical labels, tags, and geo location information.

In some embodiments, the method 700 includes: setting up a session through at least one application proxy instance (e.g., one of the proxy instances 521-525 of FIG. 5) associated with the normalized request.

In some implementations, the process S710 is similar to the process S110 of FIG. 1. In some implementations, the process S720 is similar to the process S120 of FIG. 1. In some implementations, the process S730 is similar to the process S130 of FIG. 1. In some implementations, the process S740 is similar to the process S140 of FIG. 1.

5. Method for Accessing a Financial Service System

As shown in FIG. 8, a method 800 for programmatic access of at least one financial service system (e.g., 441-443 of FIG. 4) external to a financial platform system (e.g., 400 of FIG. 4) includes, responsive to a normalized API financial service request provided by an external application system (e.g., a system of the application 452 of FIG. 4) associated with an account of the financial platform system (e.g., 400): for each external financial service system corresponding to the normalized API financial service request, using an application proxy instance (e.g., 521-525 of FIG. 5) associated with the account of the financial platform system to provide a proprietary API request to the financial service system in accordance with a proprietary API (e.g., 461-463) of the financial service system (process 810); and providing a normalized API financial service response to the external application system based on at least one proprietary API response received from an external financial service system (process S820). In the example embodiment of FIG. 8, using an application proxy instance includes using an application proxy instance that is constructed to provide a proprietary API request (e.g., by using the API 462) to the respective external financial service system (e.g., 442) on behalf of a user account (e.g., "User B") of the external application system by simulating an application (e.g., 453 of FIG. 4) of the external financial service system (e.g., 442).

In some implementations, each application proxy instance is an application proxy instance that is created as described above for the process S710 of the method 700.

In some implementations, proprietary API requests of a proprietary API (e.g., 461-463 of FIG. 4) of a financial service system include at least one of: a request for a list of transactions for at least one account of the financial service system; a request for details of a transaction associated with an account of the financial service system; a financial transfer request, a payment scheduling request; an electronic check deposit request; an account update request; a fraud reporting request; and a services request.

In some implementations, normalized API requests of the normalized API 410 of the financial platform system include at least one of: a request for a list of transactions for a user account of an external application system (e.g., a user account of an external application system of the application 452 of FIG. 4); a request for details of a transaction associated with the user account; a financial transfer request; a payment scheduling request; an electronic check deposit request; an account update request; a fraud reporting request; and a services request.

In some implementations, a primary application proxy instance and at least one secondary application proxy instance are associated with a financial service system corresponding to the normalized API financial service request, and responsive to a determination that the normalized API financial service request cannot be processed by using the primary application proxy instance, the financial platform system 400 uses the secondary application proxy instance to process the normalized API financial service request. In some implementations, the primary proxy instance corresponds to a mobile application of a respective financial service system, and the secondary proxy instance corresponds to at least one of a web-based application and a desktop application of the respective financial service system.

In some implementations, providing a normalized API financial service response to the external application system based on at least one proprietary API response received from an external financial service system (the process S820) includes transforming financial data of the proprietary API response into a normalized form. In some implementations, transforming the received financial data includes at least one of processing the financial data, cleaning the financial data, supplementing the financial data with additional information, and enhancing the financial data, and additional information includes at least one of categorical labels, tags, and geo location information. In some implementations, the received financial data is transformed as described above for S140 of FIG. 2.

In the example embodiment of FIG. 8, the method 800 is implemented by the financial platform system 400. In the example embodiment, the financial platform system is a multi-tenant financial platform system that is constructed to programmatically access at least one financial service system external to the financial platform system, as described above for the method 800.

5.1 Normalized API Financial Service Requests

In some implementations, the normalized API financial service request is provided by an external application system in a manner similar to the process of providing a normalized API account request described above for process S720 of FIG. 7.

5.1.1 Financial Data Requests

In some implementations, the normalized API financial service request is a normalized API account request for financial data, as described above for the method 700 of FIG. 7.

5.1.2 Financial Transfer Between Accounts of a Financial Service System

In some implementations, the normalized API financial service request is a financial transfer request to transfer funds between accounts of a financial service system, and the accounts are associated with user credentials of the user account (e.g., "User A", "User B" of FIGS. 4-6) of an external application system (e.g., a user account of an external application system of the application 452 of FIG. 4). For example, a user associated with the user account can request a transfer between accounts of the user at a same financial service system by using a financial application (e.g., 452) that uses the financial platform system 400.

In some implementations, the financial transfer request to transfer funds between accounts of a financial service system specifies the user account (e.g., "User A", "User B" of FIGS. 4-6) of the application system, the financial service system (e.g., "Bank 1", "Bank 2"), information identifying the source account, information identifying the destination account, and an amount of funds to be transferred. In some implementations, the financial transfer request to transfer funds between accounts of a financial service system specifies parameters. In some implementations, the financial transfer request to transfer funds between accounts of a financial service system specifies an account (e.g., a developer account) (e.g., "Dev Account A", "Dev Account B") of the financial platform system 400 associated with the external application system (e.g., an external application system of the application 452 of FIG. 4).

The application proxy system 420 uses an application proxy instance stored in association with the specified user account and the specified financial service system to perform the transfer. The application proxy system 420 uses the application proxy instance to perform the transfer by using an institution interface module (e.g., 431-433) of the specified financial service system to provide the financial service system with a proprietary API transfer request in accordance with the proprietary API (e.g., 461-463) of the financial service system.

5.1.3 Financial Transfer Between Accounts of a Same User and Different Financial Service Systems In some implementations, the normalized API financial service request is a financial transfer request to transfer funds from a source account of a source financial service system to a destination account of a destination financial service system, and the source and destination accounts are associated with respective user credentials of the user account (e.g., "User A", "User B") of the external application system. For example, a user associated with the user account can request a transfer between accounts of the user at different financial service systems by using a financial application (e.g., 452) that uses the financial platform system 400.

In some implementations, the financial transfer request to transfer funds from a source account of a source financial service system to a destination account of a destination financial service system specifies the user account (e.g., "User A", "User B") of the application system, the source financial service system, information identifying the source account, the destination financial serviced system, information identifying the destination account, and an amount of funds to be transferred. In some implementations, the financial transfer request specifies parameters. In some implementations, the financial transfer request specifies an account (e.g., a developer account) (e.g., "Dev Account A", "Dev Account B") of the financial platform system 400 associated with the external application system (e.g., an external application system of the application 452 of FIG. 4).

The application proxy system 420 uses at least one of an application proxy instance stored in association with the specified user account and the specified source financial service system and an application proxy instance stored in association with the specified user account and the specified destination financial service system to perform the transfer.

In some implementations, the application proxy system 420 selects one of the application proxy instance of the specified source financial service system and the application proxy instance of the specified destination financial service system, and uses the selected application proxy instance to perform the transfer by using an institution interface module (e.g., 431-433) of the associated financial service system to provide the financial service system with a proprietary API transfer request in accordance with the proprietary API (e.g., 461-463) of the financial service system.

In some implementations, the application proxy system 420 selects one of the application proxy instance of the specified source financial service system and the application proxy instance of the specified destination financial service system based on capabilities of the respective financial service systems.

In some implementations, the application proxy system 420 selects one of the application proxy instance of the specified source financial service system and the application proxy instance of the specified destination financial service system based on properties of the application proxy instances.

In some implementations, the application proxy system 420 selects one of the application proxy instance of the specified source financial service system and the application proxy instance of the specified destination financial service system based on transaction fees of the corresponding financial service systems.

5.1.4 Financial Transfer Between Accounts of Different Users

In some implementations, the normalized financial service request is a financial transfer request to transfer funds from a source account of a source financial service system to a destination account of a destination financial service system, the source account is associated with user credentials of the user account (e.g., "User A" of FIGS. 4-6) of the external application system, and user credentials of the destination account are not associated with the user account of the external application system. For example, a user associated with the user account (e.g., "User A" of FIGS. 4-6) can initiate the transfer (to a destination account of a different user) from the source financial service system.

In some implementations, the normalized API financial transfer request specifies the user account (e.g., "User A" of FIGS. 4-6) of the application system, the source financial service system (e.g., "Bank 1"), information identifying the source account, information identifying the destination account, and an amount of funds to be transferred. In some implementations, the normalized API financial transfer request specifies parameters. In some implementations, the normalized API financial transfer request specifies an account (e.g., a developer account) of the financial platform system 400 associated with the external application system (e.g., an external application system of the application 452 of FIG. 4).

The application proxy system 420 uses an application proxy instance stored in association with the specified user account and the specified source financial service system to perform the transfer. The application proxy system 420 uses the application proxy instance to perform the transfer by using an institution interface module (e.g., 431-433) of the specified source financial service system to provide the source financial service system with a proprietary API transfer request in accordance with the proprietary API (e.g., 461-463) of the source financial service system.

In some implementations, the normalized API financial service request is a financial transfer request to transfer funds from a source account of a source financial service system to a destination account of a destination financial service system, the destination account is associated with user credentials of the user account of the external application system, and user credentials of the source account are not associated with the user account of the external application system. For example, a user associated with the user account (e.g., "User A" of FIGS. 4-6) can initiate the transfer (from a source account of a different user) from the destination financial service system.

In some implementations, the normalized API financial transfer request specifies the user account of the application system, the destination financial service system, information identifying the destination account, information identifying the source account, and an amount of funds to be transferred. In some implementations, the normalized API financial transfer request specifies parameters. In some implementations, the normalized API financial transfer request specifies an account (e.g., a developer account) of the financial platform system 400 associated with the external application system (e.g., an external application system of the application 452 of FIG. 4).

The application proxy system 420 uses an application proxy instance stored in association with the specified user account and the specified destination financial service system to perform the transfer. The application proxy system 420 uses the application proxy instance to perform the transfer by using an institution interface module (e.g., 431-433) of the destination source financial service system to provide the destination financial service system with a proprietary API transfer request in accordance with the proprietary API (e.g., 461-463) of the destination financial service system.

5.1.5 Scheduled Payments

In some implementations, the normalized API financial service request is a request to schedule payment from a source account of a source financial service system to a destination account of a destination financial service system, the source account is associated with user credentials of the user account of the external application system. For example, a user associated with the user account can schedule payment (to a destination account of a different user) from the source financial service system.

In some implementations, the normalized API schedule payment request specifies the user account of the application system, the source financial service system, information identifying the source account, information identifying the destination account, and an amount of funds to be transferred. In some implementations, the normalized API schedule payment request specifies parameters. In some implementations, the normalized API schedule payment request specifies an account (e.g., a developer account) of the financial platform system 400 associated with the external application system (e.g., an external application system of the application 452 of FIG. 4).

The application proxy system 420 uses an application proxy instance stored in association with the specified user account and the specified source financial service system to schedule the payment. The application proxy system 420 uses the application proxy instance to schedule the payment by using an institution interface module (e.g., 431-433) of the specified source financial service system to provide the source financial service system with a proprietary API schedule payment request in accordance with the proprietary API (e.g., 461-463) of the source financial service system.

5.1.6 Electronic Check Deposit

In some implementations, the normalized API financial service request is a request for electronic deposit of a check in a destination account of a destination financial service system, and the destination account is associated with user credentials of the user account of the external application system. For example, a user associated with the user account can electronically deposit a check (to a destination account of the user) by capturing a digital image of the check.

In some implementations, the normalized API electronic deposit request specifies the user account of the application system, the destination financial service system, information identifying the destination account, and a digital image of the check. In some implementations, the normalized API electronic deposit request specifies an amount of funds indicated by the digital image of the check. In some implementations, the normalized API electronic deposit request specifies parameters. In some implementations, the normalized API electronic deposit request specifies an account (e.g., a developer account) of the financial platform system 400 associated with the external application system (e.g., an external application system of the application 452 of FIG. 4).

The application proxy system 420 uses an application proxy instance stored in association with the specified user account and the specified destination financial service system to perform the electronic deposit. The application proxy system 420 uses the application proxy instance to perform the electronic deposit by using an institution interface module (e.g., 431-433) of the destination financial service system to provide the destination financial service system with a proprietary API electronic deposit request in accordance with the proprietary API (e.g., 461-463) of the destination financial service system.

5.1.7 Update Account Information

In some implementations, the normalized API financial service request is a request to update account information of a specified financial service system.

In some implementations, the normalized API update account information request specifies the user account of the application system, the financial service system, and account update information. In some implementations, the normalized API update account information request specifies information indicating an account of the specified financial service system. In some implementations, the normalized API update account information request specifies parameters. In some implementations, the normalized API update account information request specifies an account (e.g., a developer account) of the financial platform system 400 associated with the external application system (e.g., an external application system of the application 452 of FIG. 4).

In some implementations, the normalized API request to update account information includes a request to update contact information, and the account update information includes updated contact information.

In some implementations, the normalized API request to update account information includes a request to change a password, and the account update information includes a new password.

In some implementations, the normalized API request to update account information includes a request to update account alert settings, and the account update information includes updated account alert settings.

The application proxy system 420 uses an application proxy instance stored in association with the specified user account and the specified financial service system to perform the account information update. The application proxy system 420 uses the application proxy instance to perform the account information update by using an institution interface module (e.g., 431-433) of the financial service system to provide the financial service system with a proprietary API update account information request in accordance with the proprietary API (e.g., 461-463) of the financial service system. In some embodiments, the proprietary API update account information request in accordance with the proprietary API includes at least one of an update contact information request, a change password request, and an update account alert settings request.

5.1.8 Request for Services

In some implementations, the normalized API financial service request is a request for services of a specified financial service system.

In some implementations, the normalized API services request specifies the user account of the application system, the financial service system, and service request information. In some implementations, the normalized API services request specifies parameters. In some implementations, the normalized API services request specifies an account (e.g., a developer account) of the financial platform system 400 associated with the external application system (e.g., an external application system of the application 452 of FIG. 4).

In some implementations, the normalized API services request includes a request for at least one of a new bank card and a request for new checks.

In some implementations, the normalized API services request includes a request to report fraud, and the service request information includes fraud report information.

The application proxy system 420 uses an application proxy instance stored in association with the specified user account and the specified financial service system to perform the service request. The application proxy system 420 uses the application proxy instance to perform the service request by using an institution interface module (e.g., 431-433) of the financial service system to provide the financial service system with a proprietary API service request in accordance with the proprietary API (e.g., 461-463) of the financial service system. In some embodiments, the proprietary API service request in accordance with the proprietary API includes at least one of a new bank card request, check request, and a fraud report request.

6. System Architecture: Financial Platform System

Figure 9:
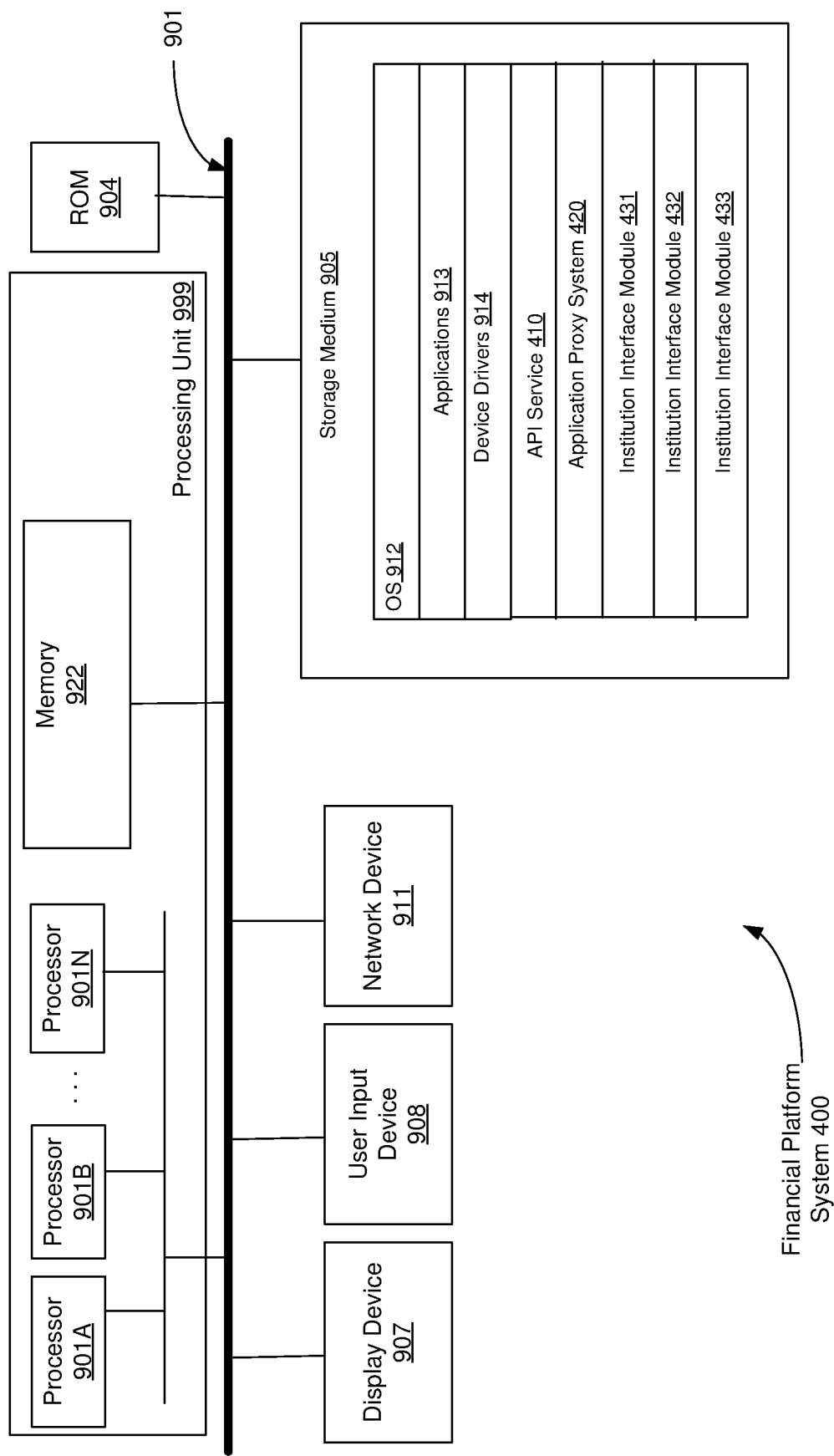
FIG. 9 is an architecture diagram of system of an embodiment.

FIG. 9 is an architecture diagram of a system (e.g., the system 100 of FIG. 1, the financial platform system 400 of FIG. 4) according to an implementation in which the system is implemented by a server device. In some implementations, the system is implemented by a plurality of devices.

The bus 901 interfaces with the processors 901A-901N, the main memory (e.g., a random access memory (RAM)) 922, a read only memory (ROM) 904, a processor-readable storage medium 905, a display device 907, a user input device 908, and a network device 911.

The processors 901A-901N may take many forms, such as ARM processors, X86 processors, and the like.

In some implementations, the system (e.g., 400) includes at least one of a central processing unit (processor) and a multi-processor unit (MPU).

The processors 901A-901N and the main memory 922 form a processing unit 999. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of an API Service, an Application Proxy System, and one or more Instance Interface Modules.

The network adapter device 911 provides one or more wired or wireless interfaces for exchanging data and commands between the system (e.g., 400) and other devices, such as financial service systems (e.g., 441-443), user devices (e.g., 471-472). Such wired and wireless interfaces include, for example, a universal serial bus (USB) interface, Bluetooth interface, Wi-Fi interface, Ethernet interface, near field communication (NFC) interface, and the like. Machine-executable instructions in software programs (such as an operating system, application programs, and device drivers) are loaded into the memory 922 (of the processing unit 999) from the processor-readable storage medium 905, the ROM 904 or any other storage location. During execution of these software programs, the respective machine-executable instructions are accessed by at least one of processors 901A-901N (of the processing unit 999) via the bus 901, and then executed by at least one of processors 901A-901N. Data used by the software programs are also stored in the memory 922, and such data is accessed by at least one of processors 901A-901N during execution of the machine-executable instructions of the software programs. The processor-readable storage medium 905 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 905 includes an operating system 912, software programs 913, device drivers 914, the API Service 410, the Application Proxy System 420, and the Institution Interface Modules 431-433.

8. Machines

The system and method of the preferred embodiment and variations thereof can be embodied and/or implemented at least in part as a machine configured to receive a computer-readable medium storing computer-readable instructions. The instructions are preferably executed by computer-executable components preferably integrated with the financial data API system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

9. Conclusion

As a person skilled in the art will recognize from the previous detailed description and from the figures and claims, modifications and changes can be made to the preferred embodiments of the invention without departing from the scope of this invention defined in the following claims.

What is claimed is:

1. A computer-implemented method for accessing user data using an application proxy instance, the method comprising:
receiving, by a computing platform from a computing device and via a normalized application programming interface (API), a request for user data associated with an account of a first user held by a first financial institution, wherein the first financial institution provides a first-party user application that enables users of the first financial institution to access data stored by the first financial institution via a first API specific to the first financial institution;
generating, by an application proxy system implemented on the computing platform, a first application proxy instance of the first-party user application by generating a digital image of an instance of the first-party user application of the first financial institution, wherein the first application proxy instance of the first-party user application is specific to the first user;
negotiating, by the application proxy system, registration of the first application proxy instance of the first-party user application, wherein negotiating registration of the first application proxy instance of the first-party user application includes providing credentials of the first user to the first financial institution;
storing, by the application proxy system, the first application proxy instance of the first-party user application in a memory, wherein the memory includes a plurality of application proxy instances associated with a plurality of users of the first financial institution;
initiating, by the application proxy system, using the first application proxy instance of the first-party user application and via the first API specific to the first financial institution, a communication session with the first financial institution to retrieve the requested user data;
retrieving, by the computing platform and via the communication session, the requested user data;
formatting, by the computing platform, the retrieved user data to a standardized format of the normalized API; and
transmitting, by the computing platform, to the computing device and in response to the request for user data, the retrieved user data in the standardized format.

2. The method of claim 1, further including:
receiving, by the computing platform, from the computing device and via the normalized API, a subsequent request for user data of the first user;
retrieving, by the application proxy system, the first application proxy instance of the first-party user application;
initiating, by the application proxy system, via the retrieved first application proxy instance of the first-party user application and with the first API specific to the first financial institution, a subsequent communication session with the first financial institution to retrieve the subsequently requested user data;
retrieving, by the computing platform and via the subsequent communication session, the subsequently requested user data;
formatting, by the computing platform, the retrieved subsequently requested user data to the standardized format of the normalized API; and
transmitting, by the computing platform to the computing device and in response to the subsequent request for user data, the retrieved subsequently requested user data in the standardized format.

3. The method of claim 1, further including:
receiving, by the computing platform, from the computing device and via the normalized API, a subsequent request for user data of the first user;
retrieving, by the application proxy system and from the memory, the first application proxy instance of the first-party user application;
initiating, by the application proxy system, via the retrieved first application proxy instance of the first-party user application and with the first API specific to the first financial institution, a subsequent communication session with the first financial institution to retrieve the subsequently requested user data;

determining, by the computing platform, that the subsequently requested user data is not available via the first application proxy instance of the first-party user application;

responsive to determining that the subsequently requested user data is not available via the first application proxy instance of the first-party user application, perform one of:

retrieving, by the application proxy system, a second application proxy instance of the first-party user application associated with the first user to retrieve the subsequently requested user data; or generating, by the application proxy system, a second application proxy instance of the first-party user application associated with the first user to retrieve the subsequently requested user data.

4. The method of claim 3, wherein the subsequently requested user data is not available via the first application proxy instance of the first-party user application because the subsequently requested user data is associated with a different account of the first user held by the first financial institution.

5. The method of claim 3, wherein the subsequently requested user data is not available via the first application proxy instance of the first-party user application because the subsequently requested data is associated with a different account of the first user held by a second financial institution.

6. The method of claim 3, wherein the subsequently requested user data is not available via the first application proxy instance of the first-party user application because the first proxy application instance is associated with a first application type of the first-party user application and the subsequently requested data is available via a second application type of the first-party user application.

7. The method of claim 6, wherein the first application type is a mobile application and the second application type is a desktop application.

8. The method of claim 1, further including:

receiving, by the computing platform and via the normalized API, a subsequent request for user data at the first financial institution;

determining, by the application proxy system, whether the communication session with the first financial institution has expired, and in response:

when the communication session with the first financial institution has not expired, retrieving, by the application proxy system, the subsequently requested user data; and when the communication session with the first financial institution has expired, initiating, by the application proxy system and via the first application proxy instance of the first-party user application including the credentials of the first user, and with the first API specific to the first financial institution, a subsequent communication session with the first financial institution to retrieve the subsequently requested user data.

9. A computing platform for accessing user data at a financial institution using an application proxy instance, comprising:

at least one processor;
a communication interface communicatively coupled to the at least one processor; and a memory storing computer-readable instructions that, when executed by the at least one processor, cause the computing platform to:

receive, from a computing device and via a normalized application programming interface (API), a request for user data associated with an account of a first user held by a first financial institution, and wherein the first financial institution provides a first-party user application that enables users of the first financial institution to access data stored by the financial institution via a first API specific to the first financial institution;

generate a first application proxy instance of the first-party user application by generating a digital image of an instance of the first-party user application of the first financial institution, wherein the first application proxy instance of the first-party user application is specific to the first user;

negotiate registration of the first application proxy instance of the first-party user application, wherein negotiating registration of the first application proxy instance of the first-party user application includes providing credentials of the first user to the first financial institution;

store the first application proxy instance of the first-party user application in the memory, wherein the memory includes a plurality of application proxy instances associated with a plurality of users of the first financial institution;

initiate, using the first application proxy instance of the first-party user application and via the first API specific to the first financial institution, a communication session with the first financial institution to retrieve the requested user data;

retrieve, via the communication session, the requested user data;

format the retrieved user data to a standardized format of the normalized API; and transmit, to the computing device and in response to the request for user data, the retrieved user data in the standardized format.

10. The computing platform of claim 9, further including instructions that, when executed by the at least one processor, cause the computing platform:

receive, from the computing device and via the normalized API, a subsequent request for user data of the first user;

retrieve, from the memory, the first application proxy instance of the first-party user application;

initiate, via the retrieved first application proxy instance of the first-party user application and with the first API specific to the first financial institution, a subsequent communication session with the first financial institution to retrieve the subsequently requested user data;

retrieve, via the subsequent communication session, the requested user data;

format the retrieved user data to the standardized format of the normalized API; and transmit, to the computing device and in response to the subsequent request for user data, the retrieved subsequently requested user data in the standardized format.

11. The computing platform of claim 9, further including instructions that, when executed by the at least one processor, cause the computing platform to:

receive, from the computing device and via the normalized API, a subsequent request for user data of the first user;

retrieve, from the memory, the first application proxy instance of the first-party user application;
initiate, via the retrieved first application proxy instance of the first-party user application and with the first API specific to the first financial institution, a subsequent communication session with the first financial institution to retrieve the subsequently requested user data;
determine that the subsequently requested user data is not available via the first application proxy instance of the first-party user application;
responsive to determining that the subsequently requested user data is not available via the first application proxy instance of the first-party user application, perform one of:
retrieve a second application proxy instance of the first-party user application associated with the first user to retrieve the subsequently requested user data; or
generate a second application proxy instance of the first-party user application associated with the first user to retrieve the subsequently requested user data.

12. The computing platform of claim 11, wherein the subsequently requested user data is not available via the first application proxy instance of the first-party user application because the subsequently requested user data is associated with a different account of the first user held by the first financial institution.

13. The computing platform of claim 11, wherein the subsequently requested user data is not available via the first application proxy instance of the first-party user application because the subsequently requested data is associated with a different account of the first user held by a second financial institution.

14. The computing platform of claim 11, wherein the subsequently requested user data is not available via the first application proxy instance of the first-party user application because the first proxy application instance is associated with a first application type of the first-party user application and the subsequently requested data is available via a second application type of the first-party user application.

15. The computing platform of claim 14, wherein the first application type is a mobile application and the second application type is a desktop application.

16. The computing platform of claim 9, wherein the instructions, when executed, further cause the computing platform to:
receive, via the normalized API, a subsequent request for user data at the first financial institution;
determine whether the communication session with the first financial institution has expired, and in response:
when the communication session with the first financial institution has not expired, retrieve the subsequently requested user data; and
when the communication session with the first financial institution has expired, initiate, via the application proxy instance of the first-party user application including the credentials of the first user, and with the first API specific to the first financial institution, a subsequent communication session with the first financial institution to retrieve the subsequently requested user data.

17. One or more non-transitory computer-readable media storing instructions that, when executed, cause a computing platform for accessing user data using an application proxy instance to:
receive, from a computing device and via a normalized application programming interface (API), a request for user data associated with an account of a first user held by a first financial institution, wherein the first financial institution provides a first-party user application that enables users of the first financial institution to access data stored by the first financial institution via a first API specific to the first financial institution;
generate a first application proxy instance of the first-party user application by generating a digital image of an instance of the first-party user application of the first financial institution, wherein the first application proxy instance of the first-party user application is specific to the first user;
negotiate registration of the first application proxy instance of the first-party user application, wherein negotiating registration of the first application proxy instance of the first-party user application includes providing credentials of the first user to the first financial institution;
store the first application proxy instance of the first-party user application in the memory, wherein the memory includes a plurality of application proxy instances associated with a plurality of users of the first financial institution;
initiate, using the first application proxy instance of the first-party user application and via the first API specific to the first financial institution, a communication session with the first financial institution to retrieve the requested user data;
retrieve, via the communication session, the requested user data;
format the retrieved user data to a standardized format of the normalized API; and
transmit, to the computing device and in response to the request for user data, the retrieved user data in the standardized format.

18. The one or more non-transitory computer-readable media of claim 17, further including instructions that, when executed, cause the computing platform to:
receive, from the computing device and via the normalized API, a subsequent request for user data of the first user;
retrieve, from the memory, the first application proxy instance of the first-party user application;
initiate, via the retrieved first application proxy instance of the first-party user application and with the first API specific to the first financial institution, a subsequent communication session with the first financial institution to retrieve the subsequently requested user data;
retrieve, via the subsequent communication session, the requested user data;
format the retrieved user data to the standardized format of the normalized API; and
transmit, to the computing device and in response to the subsequent request for user data, the retrieved subsequently requested user data in the standardized format.

19. The one or more non-transitory computer-readable media of claim 17, further including instructions that, when executed, cause the computing platform to:
receive, from the computing device and via the normalized API, a subsequent request for user data of the first user;
retrieve, from the memory, the first application proxy instance of the first-party user application;
initiate, via the retrieved first application proxy instance of the first-party user application and with the first API specific to the first financial institution, a subsequent communication session with the first financial institution to retrieve the subsequently requested user data;
determine that the subsequently requested user data is not available via the first application proxy instance of the first-party user application;
responsive to determining that the subsequently requested user data is not available via the first application proxy instance of the first-party user application, perform one of:
retrieve a second application proxy instance of the first-party user application associated with the first user to retrieve the subsequently requested user data; or
generate a second application proxy instance of the first-party user application associated with the first user to retrieve the subsequently requested user data.

20. The one or more non-transitory computer-readable media of claim 19, wherein the subsequently requested user data is not available via the first application proxy instance of the first-party user application because the first proxy application instance is associated with a first application type of the first-party user application and the subsequently requested data is available via a second application type of the first-party user application.

21. The one or more non-transitory computer-readable media of claim 17, wherein the instructions, when executed, further cause the computing platform to:
receive, via the normalized API, a subsequent request for user data at the first financial institution;
determine whether the communication session with the first financial institution has expired, and in response:
when the communication session with the first financial institution has not expired, retrieve the subsequently requested user data; and
when the communication session with the first financial institution has expired, initiate, via the application proxy instance of the first-party user application including the credentials of the first user, and with the first API specific to the first financial institution, a subsequent communication session with the first financial institution to retrieve the subsequently requested user data.

\* \* \* \* \*